United States Patent
Meghnot et al.

(10) Patent No.: US 6,283,757 B1
(45) Date of Patent: Sep. 4, 2001

(54) FULL MOTION TWO SEAT INTERACTIVE SIMULATOR

(75) Inventors: Rupert L. A. Meghnot, Orlando; John D. Younkin, Oviedo, both of FL (US)

(73) Assignee: Simulation Entertainment Group, Inc., Orlando, FL (US)

( * ) Notice: Subject to any disclaimer, the term of this patent is extended or adjusted under 35 U.S.C. 154(b) by 0 days.

(21) Appl. No.: 09/415,951

(22) Filed: Oct. 8, 1999

Related U.S. Application Data

(60) Provisional application No. 60/103,826, filed on Oct. 9, 1998.

(51) Int. Cl.$^7$ ................................................ G09B 9/46
(52) U.S. Cl. .............................. 434/33; 434/29; 434/55; 434/58
(58) Field of Search ................... 434/29, 30, 32, 434/33, 38, 43–45, 55, 57, 59, 62, 307 R, 30 P, 365; 446/7, 37; 472/59, 60, 130; 345/139, 156, 199, 426, 431; 348/122, 123; 318/564; 244/189, 190, 223; 351/210; 703/6, 8; 706/11, 45; 74/89.15, 469, 490.1, 471 XY

(56) References Cited

U.S. PATENT DOCUMENTS

| | | |
|---|---|---|
| D. 345,178 | 3/1994 | Peterson . |
| 2,485,266 | 10/1949 | Edinburg . |
| 3,618,256 * | 11/1971 | Monks ...................................... 446/7 |
| 4,120,099 | 10/1978 | Fett . |
| 4,207,688 * | 6/1980 | Derderian et al. ...................... 434/43 |
| 4,386,914 * | 6/1983 | Dustman ................................ 434/32 |
| 4,464,116 * | 8/1984 | Schoolcraft ............................ 434/33 |
| 4,478,407 | 10/1984 | Manabe . |
| 4,584,896 * | 4/1986 | Letovsky ............................... 74/490.1 |
| 4,601,663 * | 7/1986 | Allison et al. ........................... 434/33 |
| 4,688,443 * | 8/1987 | Fabre et al. ............................. 74/469 |
| 4,710,128 | 12/1987 | Wachsmuth et al. . |
| 5,129,826 * | 7/1992 | Munsch ................................... 434/32 |
| 5,309,766 | 5/1994 | Touzeau et al. . |
| 5,366,375 | 11/1994 | Sarnicola . |
| 5,415,549 * | 5/1995 | Logg ....................................... 434/38 |
| 5,431,569 * | 7/1995 | Simpkins et al. ....................... 434/29 |
| 5,490,784 | 2/1996 | Carmein . |
| 5,496,220 * | 3/1996 | Engstrand ............................... 472/60 |
| 5,509,806 * | 4/1996 | Ellsworth ............................... 434/29 |

(List continued on next page.)

FOREIGN PATENT DOCUMENTS

| | | | |
|---|---|---|---|
| 5-11685 * | 1/1993 | (JP) ....................................... 434/33 |
| WO 93/16776 * | 9/1993 | (WO) ................................ 434/307 R |

*Primary Examiner*—Joe H. Cheng
(74) *Attorney, Agent, or Firm*—Brian S. Steinberger; Law Office of Brian S. Steinberger

(57) ABSTRACT

Full motion interactive simulator for use by two or more persons that can play a simulation game running on a display screen, where each player can alternate controlling the pitch and roll of a motion base platform supporting a vehicle on which the players sit. A joystick mounted in front of each player can be moved forward, backward, side-to-side, and in 360 degree circles to cause the platform to pitch and roll along any angle. The joystick can have separate buttons for firing weapons at targets on the display screen, controlling the position of images on the screen and answering questions by the system such as yes, and no to certain questions. Each player can have a set of foot pedals in front of their seats, where a left pedal can cause the screen image to rotate to the left, and the right pedal can cause the screen image to rotate to the right. The active player on the joystick controls both pedals at one time. A collective lever can be positioned between the players, where pulling up the lever causes an upward altitude on the display image and pushing the lever down causes the display image to move downward. The vehicle can be an a helicopter, an airplane, a jet, an automobile, a motorcycle, a truck, a military tank, a speedboat, a submarine and a jetski.

16 Claims, 18 Drawing Sheets

U.S. PATENT DOCUMENTS

| | | | | |
|---|---|---|---|---|
| 5,678,999 | * | 10/1997 | Cicare | 434/33 |
| 5,689,619 | * | 11/1997 | Smyth | 706/45 |
| 5,878,981 | * | 3/1999 | Dewey | 244/190 |
| 5,911,634 | * | 6/1999 | Nidata et al. | 472/59 |
| 5,931,739 | * | 8/1999 | Layer et al. | 472/60 |
| 6,079,982 | * | 6/2000 | Meader | 434/29 |
| 6,106,298 | * | 8/2000 | Pollak | 434/29 |

* cited by examiner

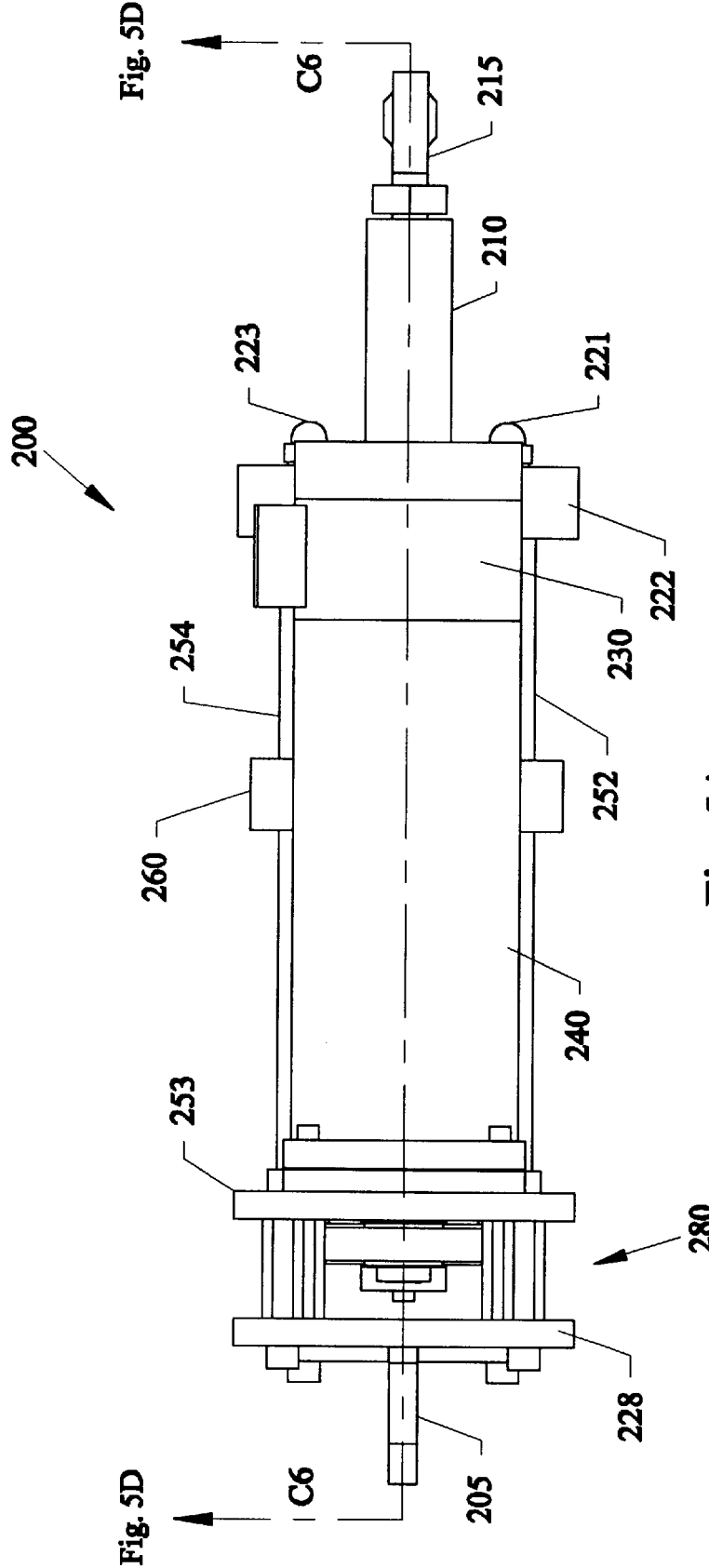

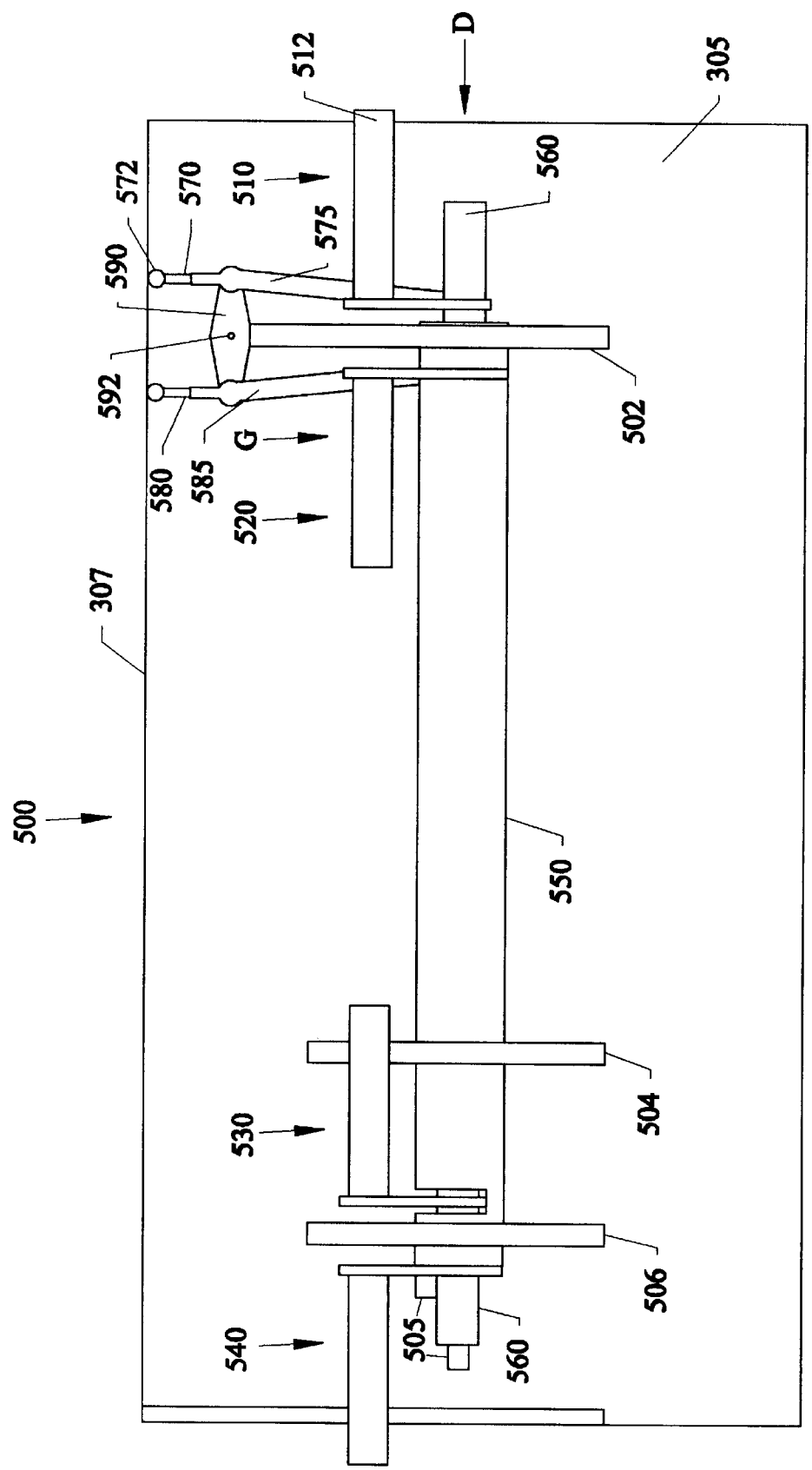

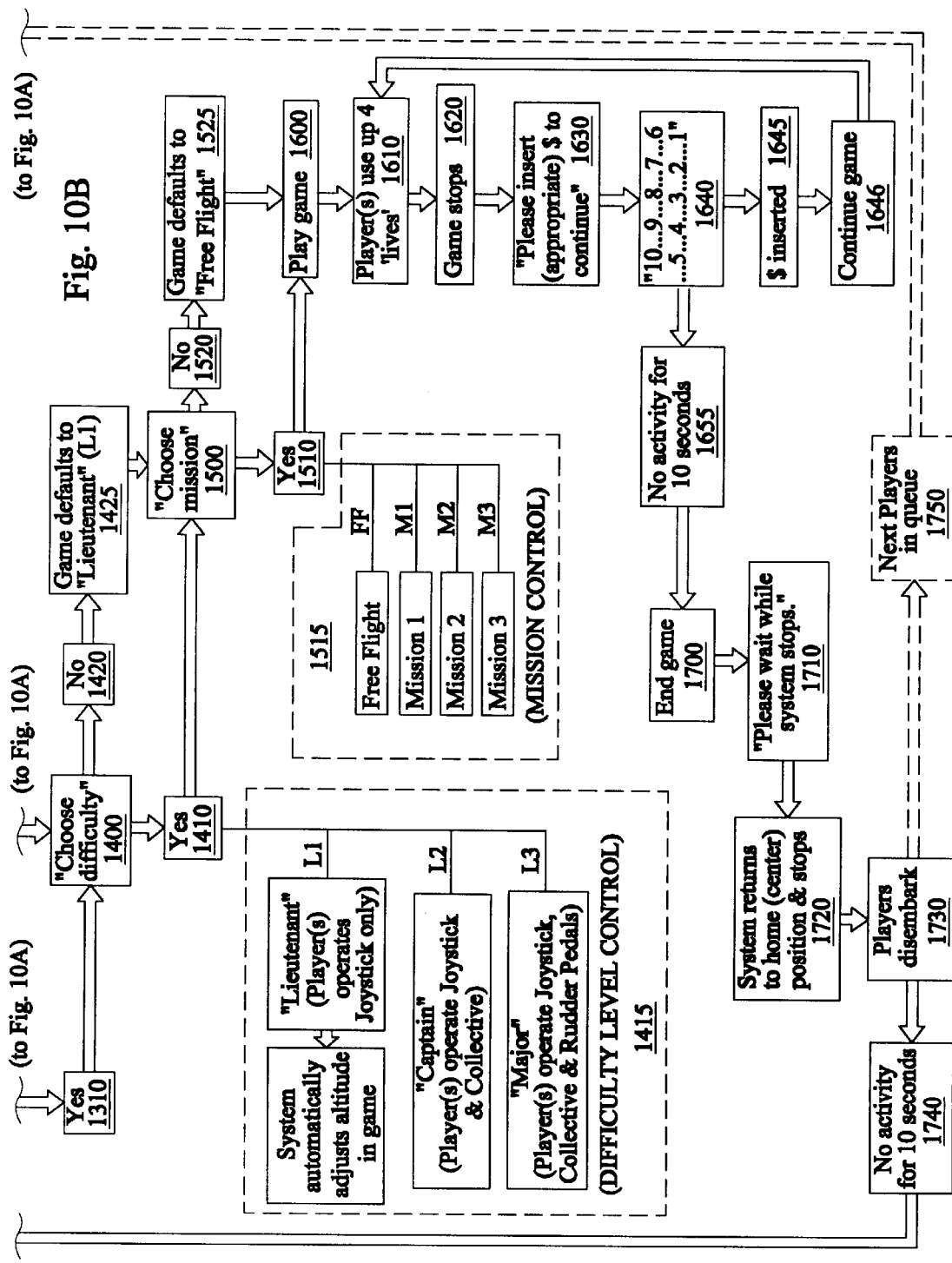

FULL MOTION TWO SEAT INTERACTIVE SIMULATOR

This invention relates to motion base simulators, and in particular to simulators having at least two independently interactive seats within full motion cab bodies such as automobiles, trucks, military conveyances, water borne conveyances, and claims priority to U.S. Provisional Application No. 60/103,826 filed on Oct. 9, 1998.

BACKGROUND AND PRIOR ART

Motion simulators have been around for many years. However, many of these devices are extremely expensive to build, and elaborate and complex to operate. See for example, U.S. Pat. No. 4,710,128 to Wachsmuth et al.; U.S. Pat. No. 5,366,375 to Samicola; and U.S. Pat. No. 5,490,784 to Carmein. Additionally, these patents do not have the exterior appearance and structures of the actual devices that are being simulated such as automobiles, trucks, military conveyances, and water borne vehicles.

Other patents of interest that the inventors are also aware of include U.S. Pat. Des. 345,178 to Peterson; U.S. Pat. No. 2,485,266 to Edinburg; U.S. Pat. No. 4,120,099 to Fett; U.S. Pat. No. 4,478,407 to Manabe and U.S. Pat. No. 5,309,766 to Touzeau et al.

All of the above patents are generally concerned with a motion simulation effect for a single user. U.S. Pat. No. 5,490,784 to Carmein in FIGS. 17–20 shows two users but limits that to an interactive application in a virtual reality environment such as "teaching dancing lessons . . . simulating wrestling . . . " between two persons. While FIG. 20 shows two persons in a simulator, that application is for the users to only be on the receiving end of getting simulation effects, and not for independently controlling and operating the simulation effects.

None of these patents allow for full interactivity from both the driver and the passenger in a full motion simulator. None of these patents allow for both the driver and the passenger to be able to separately and independently control the simulator.

SUMMARY OF THE INVENTION

The first objective of the present invention is to provide a full motion simulator where either a first player or a second player can alternate controlling the pitch and roll of a motion base for supporting the players in the simulator.

The second object of this invention is to provide a full motion simulator where a first player can control the pitch and roll of a motion base simulator while a second player can control a weapon control.

The third object of this invention is to provide a full motion simulator having foot pedals for controlling the yaw image on a display screen.

The fourth object of this invention is to provide a full motion simulator having a lever for controlling the altitude of the image on a display screen.

The fifth object of this invention is to provide two identical mechanical actuators substantially oriented perpendicular to one another for controlling pitch and roll positions of a motion base simulator.

A preferred embodiment of the invention is a full motion interactive simulator for two or more persons that includes a vehicle such as a helicopter cab positioned on a motion platform that is connected to a base. A first piston extendable actuator is both pivotally connected to both the base and the A-frame base support controls the pitch of the platform and causes the platform to tilt forward and to tilt backward. A second piston extendable actuator is oriented substantially perpendicular to the first actuator is connected to both the base and to the platform and controls the roll of the platform causing the platform to roll left and roll right. Both the first and second piston extendable actuators can be identical and each can include a lead screw piston connected to a yoke the latter of which moves up and down about one or more guide rods.

Two players can be seated on the motion platform and play a simulation game that they can view on a display screen such as a monitor, a liquid crystal display, and the like that is positioned in front of them. Both players can have control devices such as joysticks so that each player can control both the first and the second actuators. Each player can alternate controlling the actuators by their respective joystick. Both players can have a set of right and left foot pedals in front of their seats for controlling the yaw direction of a image on the display screen. The left foot pedal can control yaw movement of the image on the display screen to a left direction, and the right foot pedal can control moving the image on the display screen to the right direction.

Connected to the platform between the two players can be a mechanical spring loaded altitude control lever, where pulling the lever upward causes the image on the display screen to appear at a higher altitude and pushing the lever downward causes the image on the display screen to be at a lower altitude.

Both joystick type controls can include buttons and switches for activating weapon simulation effects, where a player can simultaneously control both actuators and the weapons to fire. Alternatively, one player can control both actuators and the second player can control the firing of the weapons.

In addition to a helicopter cab, the vehicles supported by the platform can be either an open top or covered cab covered such as but not limited to an airplane, a jet, an automobile, a motorcycle, a truck, a military tank, a speedboat, a submarine, and a jetski.

Further objects and advantages of this invention will be apparent from the following detailed description of a presently preferred embodiment which is illustrated schematically in the accompanying drawings.

BRIEF DESCRIPTION OF THE FIGURES

FIG. 5A is a front view of the actuator of FIG. 4A along arrow C4 with the lead screw and drive gear shrouds removed.

FIG. 7A is a top view of the rudder control pedals shown in FIG. 2.

FIGS. 10A and 10B is a flow chart of a program that can be used to run a simulation game for the invention.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
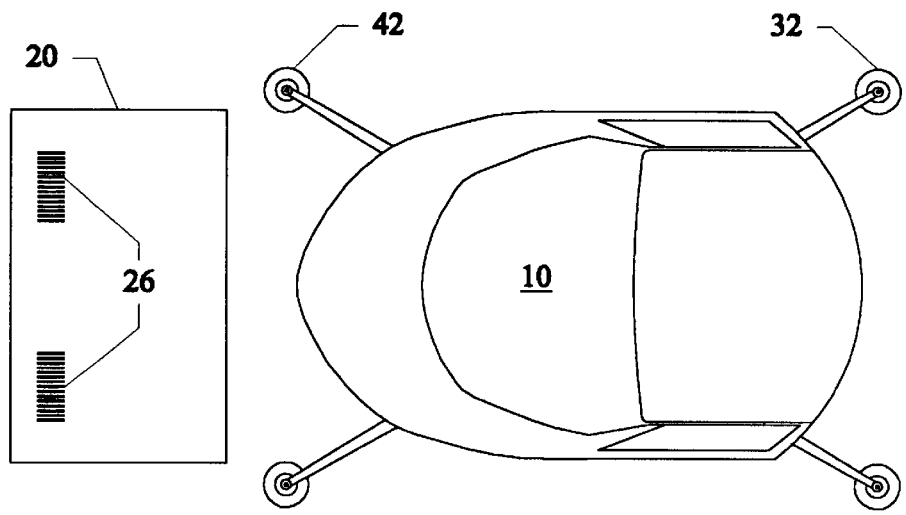
FIG. 1B is a top view of FIG. 1A along arrow A.
Figure 1A:
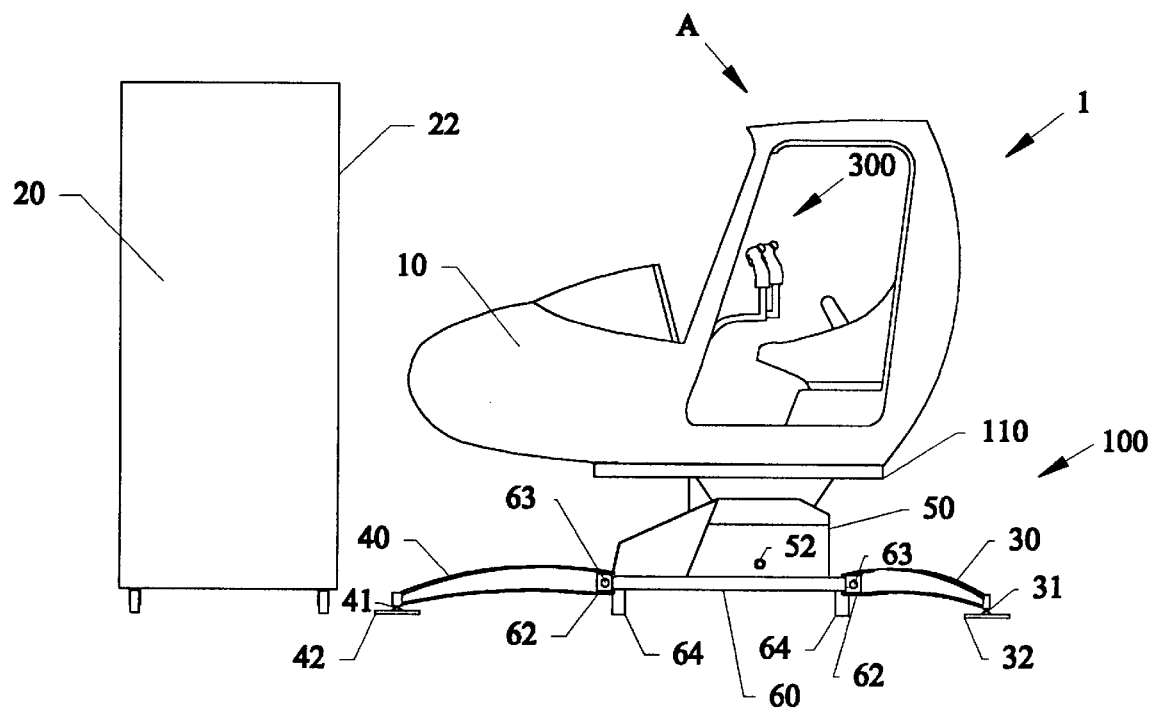
FIG. 1A is a side view of a preferred embodiment of the two seat full motion interactive simulator invention for a helicopter vehicle with a large screen display for the simulation image .

FIG. 1A is a side view of a preferred embodiment 1 of the two seat full motion interactive simulator invention for a helicopter vehicle 10 with a large screen display 20 for the simulation image. FIG. 1B is a top view of FIG. 1A along arrow A. For the preferred embodiment the nose of the helicopter vehicle can be positioned approximately 6 inches to the display 20, approximately 136.5 inches from rear foot pads 32 to the display, and approximately 61.5 inches from the right front foot pads 42 to the right rear foot pads 32. Two people can sit side-by-side in the helicopter-shaped fiberglass cab and face a 60 inch video screen 22 that enclosed in a display case 20. Two sets of slats 26 can be cut into the top of the display case 20 to provide ventilation/cooling for the system components which will be described in more detail later. Although, a helicopter vehicle cab is shown, the invention can be used with other closed and open top vehicles such as but not limited to automobiles, motorcycles, trucks, military conveyances, tanks, jeeps, aircraft, jets, water-borne conveyances, jet-skis, submarines, speed boats, and the like, and other multi-seat open platforms for theater application. Each of the foot pads 32, 42 can be approximately 6 inch diameter steel (approximately 1/8 inch thick) foot pads that can be attached to swiveling screws 31, 41 at the end of each leg 30, 40 which increases stability, and various additional materials such as but not limited to Velcro, rubber, felt, and the like can be secured to the bottom of each foot pad 32, 42 for convenience and added stability.

Figure 2:
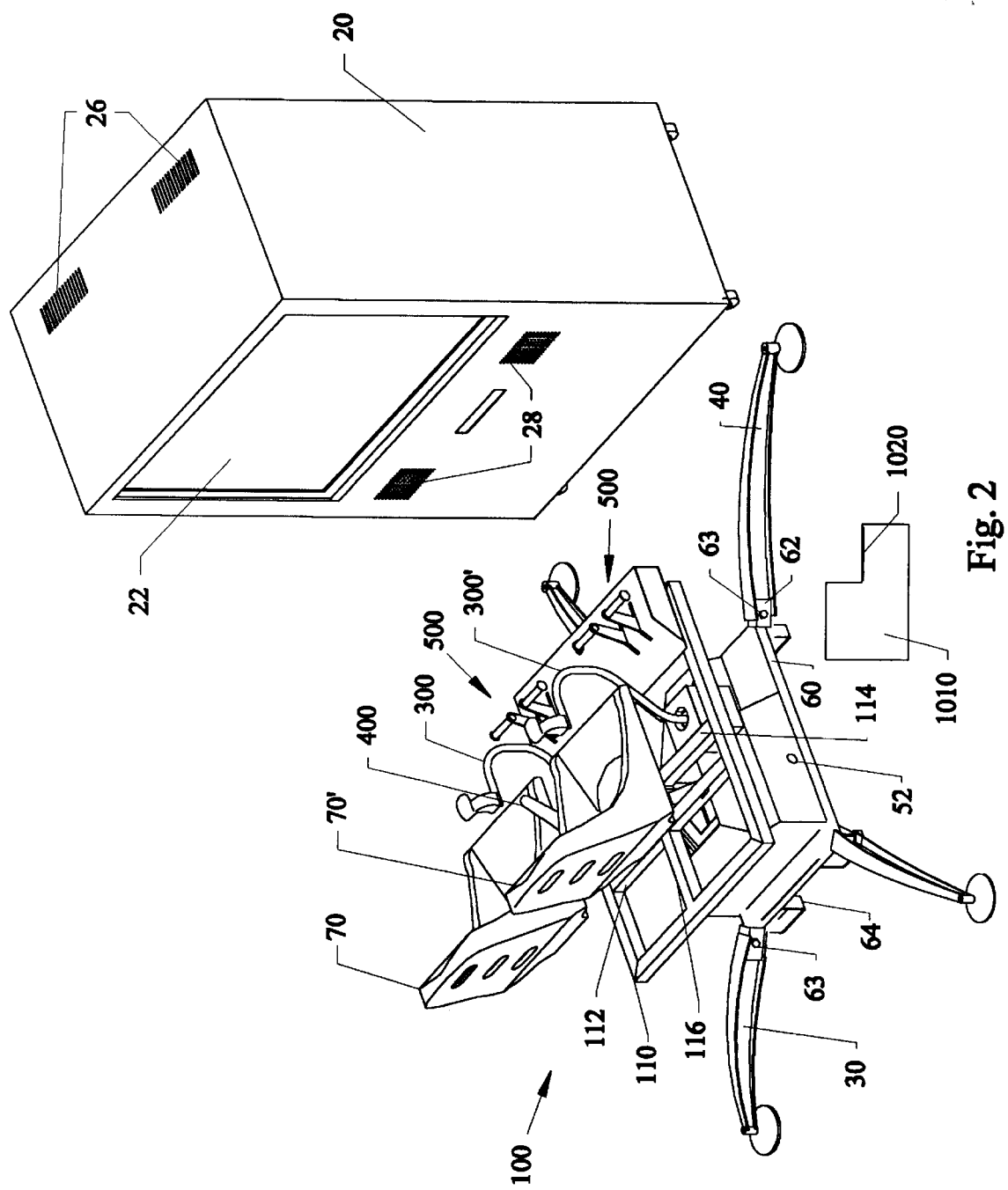
FIG. 2 is a perspective view of the two seat motion base platform and display of FIGS. 1A–1B without a vehicle.

Referring to FIG. 2, each player can use a controller 300(to be described in more detail in FIG. 6) such as a joystick to operate, with identical functions. The actuators 200(shown in more detail in reference to FIGS. 4A–5D) can be enclosed in a metal enclosure (bellows) 50 that protects hands from being injured, and curious eyes from seeing the actuators 200 within, and can be selectively opened with key access 52. This bellows 50 allows full movement of the upper platform 110 of the motion base 100. The legs 30, 40 used for stability only can be fitted with square steel tubes that sleeve into the square steel tubing 62 of the lower platform 60 on the motion base 100, and are secured with two 3/8" bolts 63. Two sets of fork-lift tubes 64 each being approximately 2 inches deep can be attached under the lower platform, on which the system rests, and can be moved with a simple pallet jack.

FIG. 2 is a perspective view of the two seat motion base platform 100 and display 20 of Figures 1A–1B without a vehicle. Two seats 70, 70' such as but not limited to JAZ Lo-Back racing seats, can be mounted upon a 1 inch steel tube frame structure of parallel tubes 112, 114 connected to side of frame 110 by a cross-piece 116. The right-seat player 70' can utilize a full functional helicopter cyclic/joystick 300' (shown and described in reference to FIG. 6), with a (combat helicopter simile) grip, with trigger and other weapons control buttons, that controls the movement of the platform 110 while playing the game and/or training being displayed on display screen 22. This cyclic/joystick 300' allows full movement between the player's legs, and is mounted to a pot-assembly (potentiometers that measure and modulate movement) attached to the floor. The left-seat player 70 utilizes another cyclic/joystick 300, identical to the right-seat player cyclic/joystick 300'. An altitude control collective lever 400(shown and described in reference to FIG. 8) can be mounted to the inside of the seat frame assembly (under the seats), which also utilizes potentiometers to measure and modulate movement, and is used during game playing and/or training based on image on the display 20, to make the point-of-view (POV) in the game to change in perceived altitude. Altitude collective lever juts through an opening located between the seats 70, 70', allowing usage by either of the seated players (trainers).

Two sets of pedals are used as a rudder control assembly 500(to be shown and described in reference to FIGS. 7A–7B) can be mounted to the floor of platform 110 in front of the seats 70, 70' and can also use potentiometers to measure and modulate the pedals' movements, and controls the POV's(point-of-view) yaw perception of the game and/or training image being shown on the display 20. The pedals can be married to each other, allowing either player to control the POV yaw in the game and/or training simulation. Display 20 can be a Sharp 60 inch screen Notevision 2 LCD projector and can include two sets of front holes 28 cut into the front of the display case to allow the speakers used for this system.

Figure 3A:
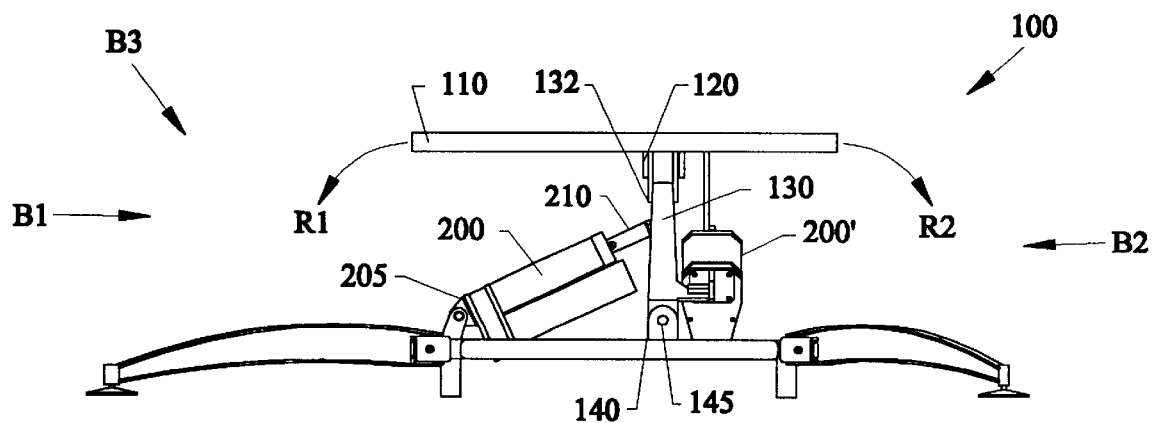
FIG. 3A is a side view of the motion base platform of the preceding Figures.
Figure 3B:
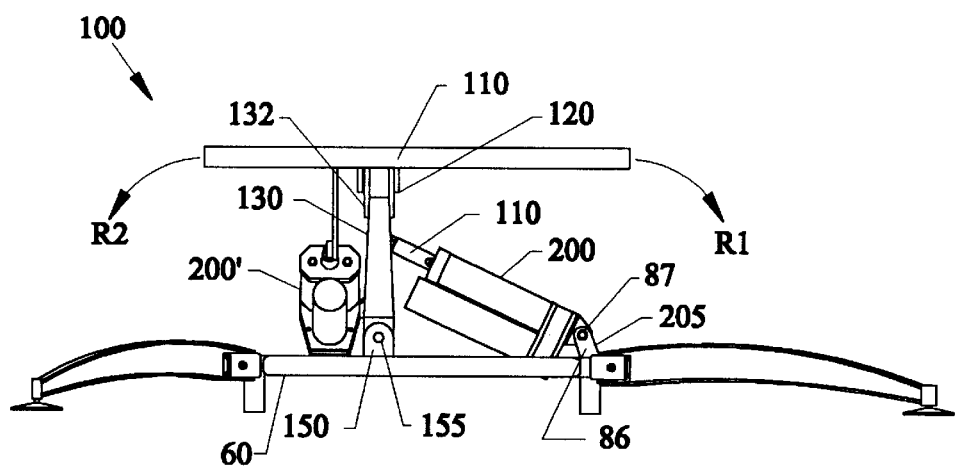
FIG. 3B is an opposite side view of the motion base platform of FIG. 3A.
Figure 3C:
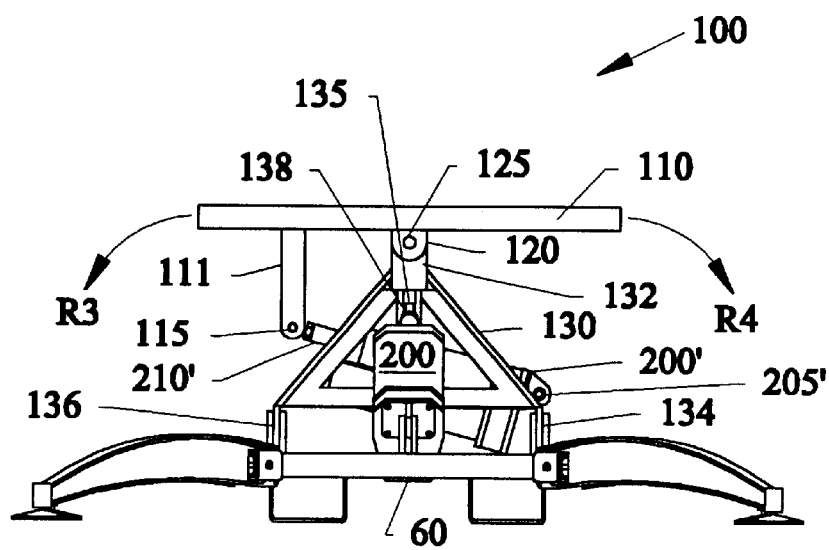
FIG. 3C is a front view of FIG. 3A along arrow B1.
Figure 3D:
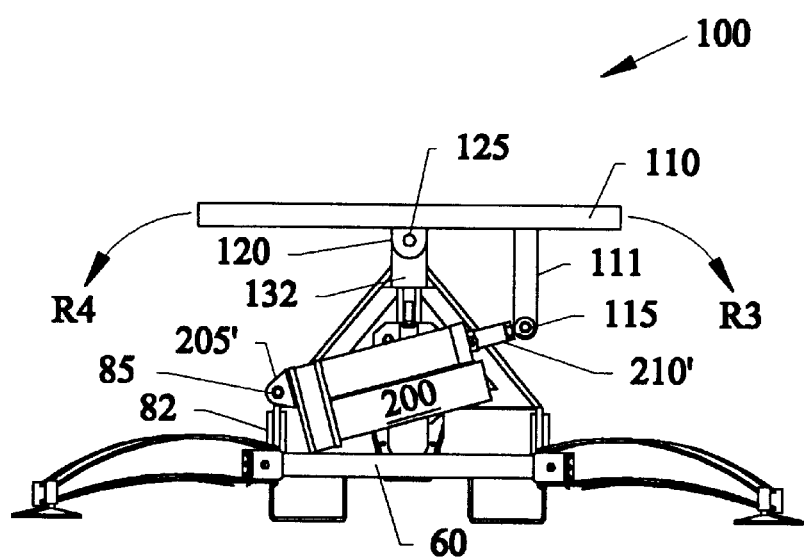
FIG. 3D is a rear view of FIG. 3A along arrow B2.
Figure 3E:
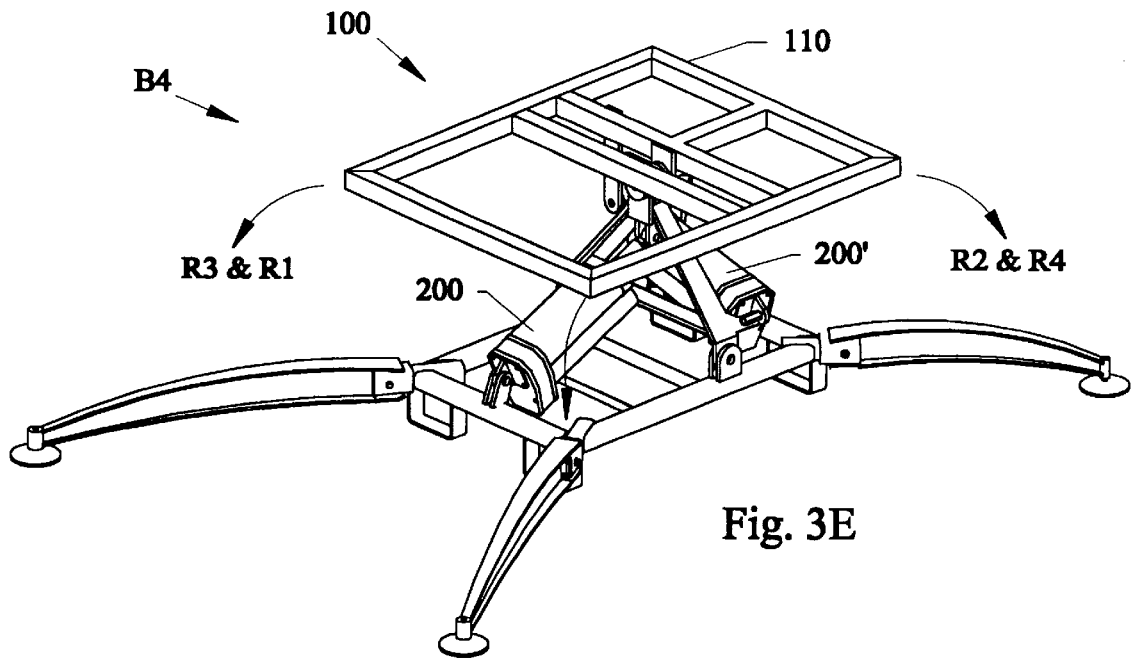
FIG. 3E is a front right perspective view of the motion base platform of FIG. 3A along arrow B3.
Figure 3F:
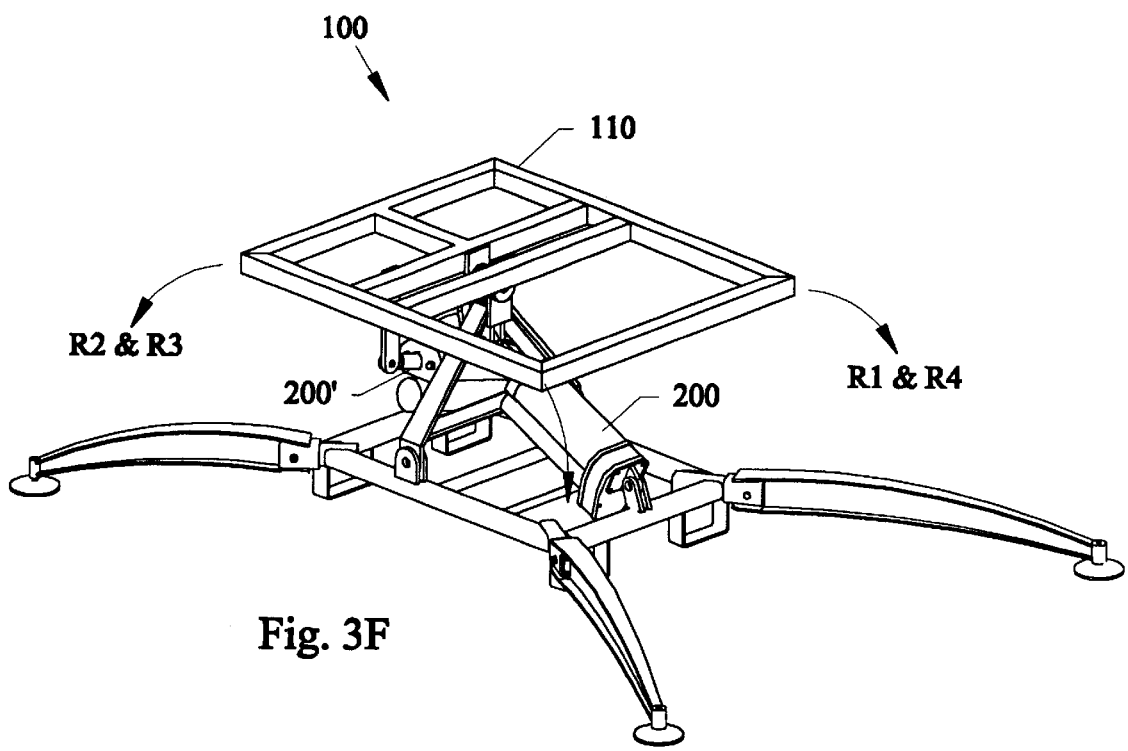
FIG. 3F is a front left perspective view of the motion base platform of FIG. 3E along arrow B4.

FIG. 3A is a side view of the motion base 100 and platform 110 of the preceding Figures. FIG. 3B is an opposite side view of the motion base 100 and platform 110 of FIG. 3A. FIG. 3C is a front view of FIG. 3A along arrow B1. FIG. 3D is a rear view of FIG. 3A along arrow B2. FIG. 3E is a front right perspective view of the motion base 100 and platform 110 of FIG. 3A along arrow B3. FIG. 3F is a front left perspective view of the motion base 100 and platform 110 of FIG. 3E along arrow B4.

Referring to FIGS. 3A–3F, the motion base 100 includes two actuators 200, 200'(each described in more detail in reference to FIGS. 4A–5D, which allow the platform to tilt and roll along four directions R1–R4 and combinations of those directions.

Referring to FIGS. 3A–3F, platform 110 can be movable to tilt forward in the direction of arrow R1 up to approximately 50 degrees(pitch) from vertical by piston screw 210 of actuator 200 contracting inward. Platform 110 can tilt backward in the direction of arrow R2 up to approximately 50 degrees(pitch) from vertical by the piston screw 210 of actuator 200 extending outward in length. For the tilting function, platform 110 is connected by a parallel plate clevis member 120 to another parallel plate clevis member 132 on A-frame 130 so that both the platform 110 and A-frame 130 can tilt together in the direction of arrows R1 and R2 by having lower A-frame connection points 134, 136 pivotally rotating about the pivot axes 145, 155 of lower clevis members 140 and 150, respectively. Top clevis member 120 can include two parallel plates welded to a mid-lower surface of platform 110, and having an axle 125 therethrough that passes through upward projecting parallel plates 132 of A-frame 130. At a mid-area of A-frame 130 is a clevis member 138 having a pivotal connection 135 that allows outward end of piston 210 to rotate therein. The opposite end 205 of actuator 200 is pivotally connected at point 87 to an upward projecting clevis type member 86 on base 60.

Referring to FIGS. 3A–3F, platform 110 can be movable to roll left in the direction of arrow R4 up to approximately 50 degrees from vertical by piston screw 210' of actuator 200' extending outward in length. Platform 110 can roll right in the direction of arrow R3 up to approximately 50 degrees from vertical by the piston screw 210' of actuator 200' contracting inward. Piston screw 210' connects to a pivoting end connection 115 on a downward rod 111 that is permanently mounted underneath and perpendicular to platform 110. Lower end 205' of actuator 200' is pivotally connected to horizontal rod 82, attached to the A-frame 130 near the connection point 134 having a pivot end 85. The pitching function, platform 110 is connected by a clevis member 120 to an A-frame 130 so that both the platform 110 and A-frame 130 can tilt together in the direction of arrows Ri and R2 by pivotally rotating about the pivot axes 145, 155 of lower clevis members 140 and 150, respectively. Top clevis member 120 can include two parallel plates welded to a mid-lower surface of platform 110, and having a axle 125 therethrough that passes through upward projecting plates 132 of A-frame 130.

Referring to FIGS. 3E–3F, actuators 200, 200' allow the platform 110 to rotate in combinations of the directions such as R1&R3, R2&R4, R2&R3, R1&R4, and the like. Actuators 200, 200' can work independently, allowing the platform 110 to pitch and roll simultaneously.

Figure 4A:
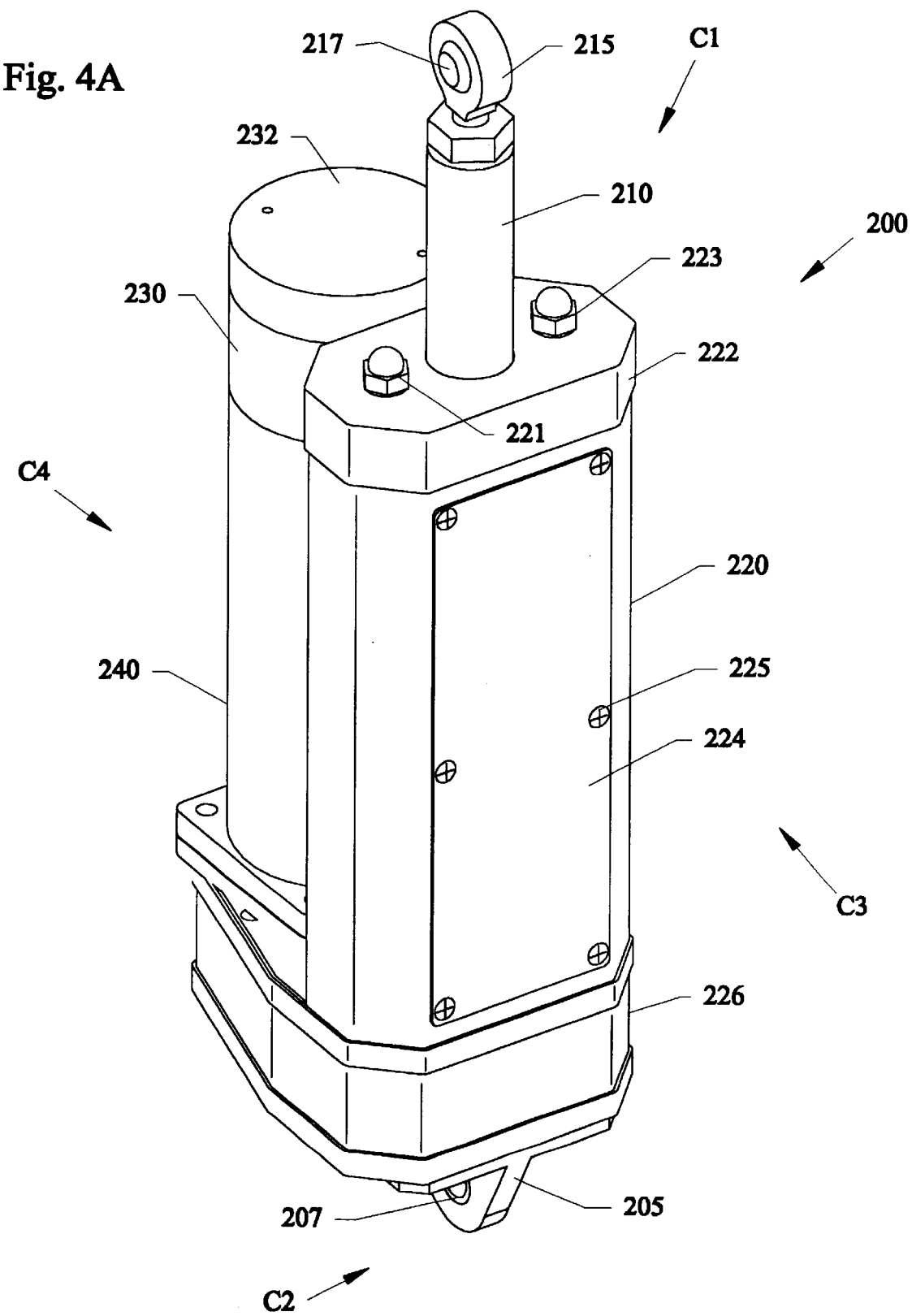
FIG. 4A is a perspective view of one of the actuator assemblies shown in the preceding Figures.
Figure 4B:
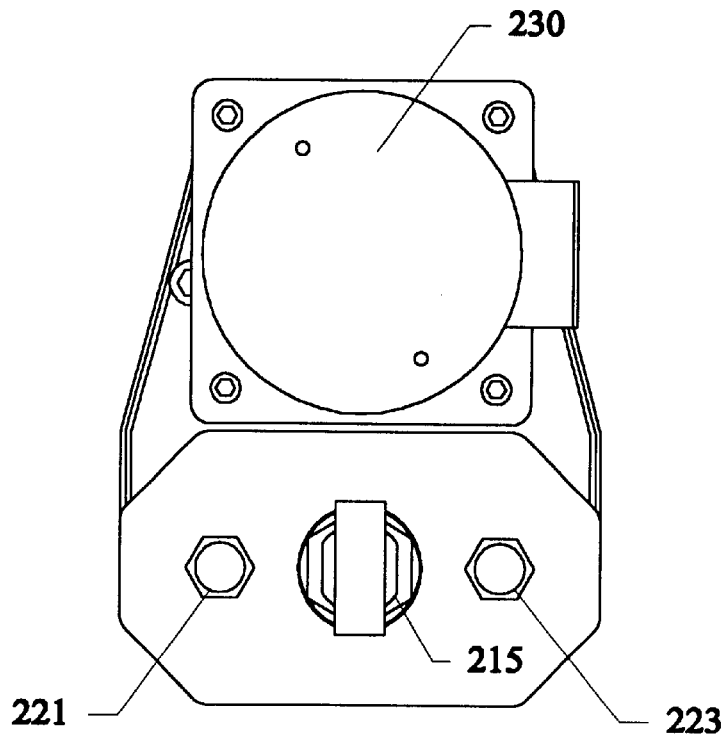
FIG. 4B is a top view of the actuator assembly of FIG. 4A along arrow C1.
Figure 4C:
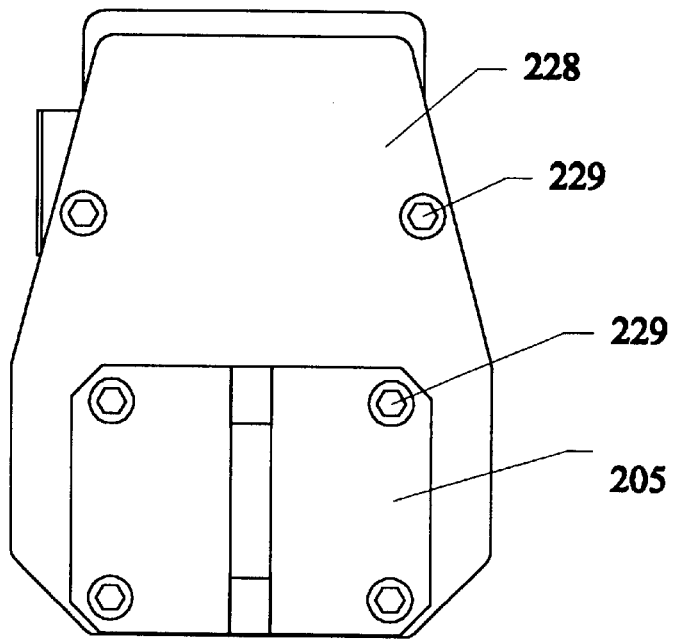
FIG. 4C is a bottom view of the actuator assembly of FIG. 4A along arrow C2.

FIG. 4A is a perspective view of one of the actuator assemblies 200 shown in the preceding Figures. FIG. 4B is a top view of the actuator assembly 200 of FIG. 4A along arrow C1. FIG. 4C is a bottom view of the actuator assembly 200 of FIG. 4A along arrow C2. Although only one actuator assembly 200 is shown, the other actuator assembly 200' is identical in components thereof.

Referring to FIGS. 4A–4C, actuator 200 includes lower end 205 having a through-hole 207 for being pivotally mounted to the lower platform 60 of motion base 100 previously described. Projecting upward from actuator 200 is a lead screw piston 210 having a pivot screw head 215 and a through-hole 217 for being pivotally mounted to the A-frame 130 as previously described. A shroud cover 220 covers the interior components of lead screw piston 210. Guide rods for the piston 210 to be described later are held in place with rounded half-nuts 221, 223 on the top of lid 222. A removable face plate 224 is over an opening in shroud cover 220 and can be held in place with screws 225. A lower shroud cover 226 can be used to cover interior components such as the bottom of the lead screw piston and the drive gears. An optical sensor 265 such as but not limited to a Omron EE-SPY415 by Sager Electronics, can be used to read the travel distance of the lead screw piston 210 located within shroud cover 220. The motor 240, such as but not limited to a 1& ½ horse power Cycletrol 3278 from API Motion Inc., can be used to cause the lead screw piston 210 to extend and contract in respect to lid 222 of actuator 200. Motor 240 can be supported by and connected to the rest of actuator 200 by a mount support and plate 228 held in place by fasteners 229 such as screws, and can be attached to an encoder 230 such but not limited to a two channel optical encoder DM-655 from Servo Systems, and a removable top lid 232 thereon.

Figure 5B:
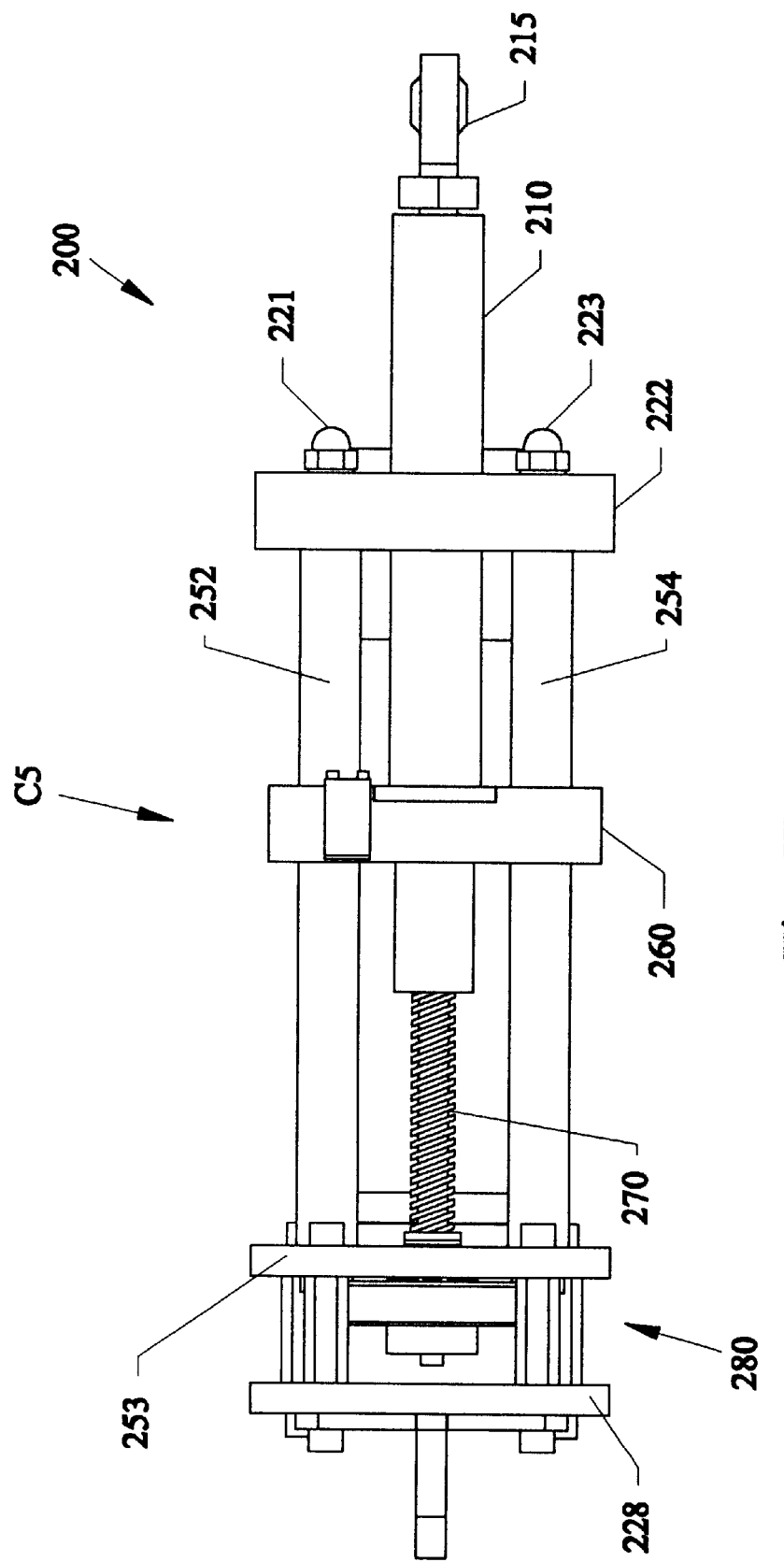
FIG. 5B is a rear view of the actuator of FIG. 4A along arrow C3 with the lead screw and drive gear shrouds removed.
Figure 5C:
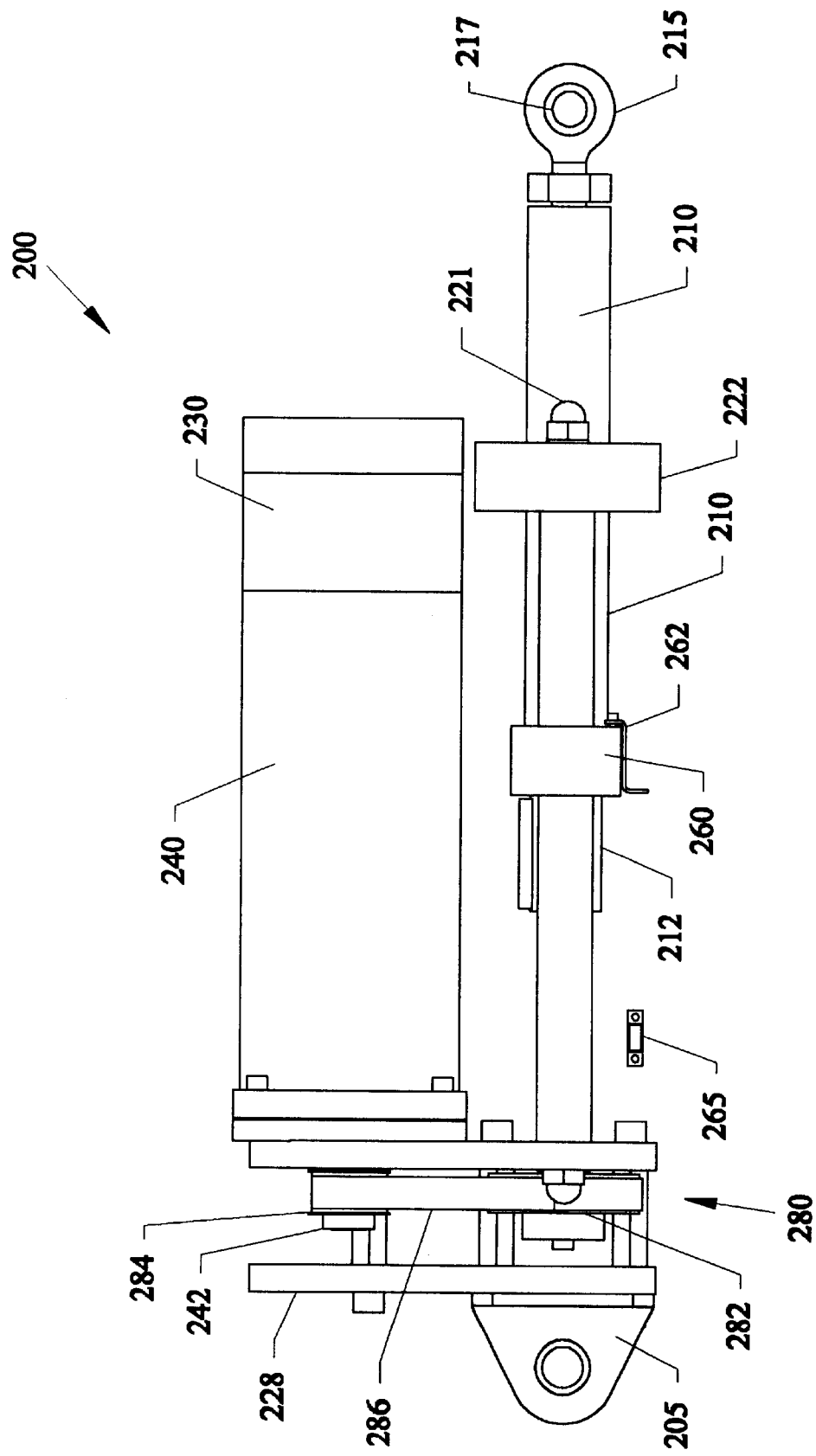
FIG. 5C is a left view of the actuator of FIG. 5B along arrow C5 with the lead screw and drive gear shrouds removed.
Figure 5D:
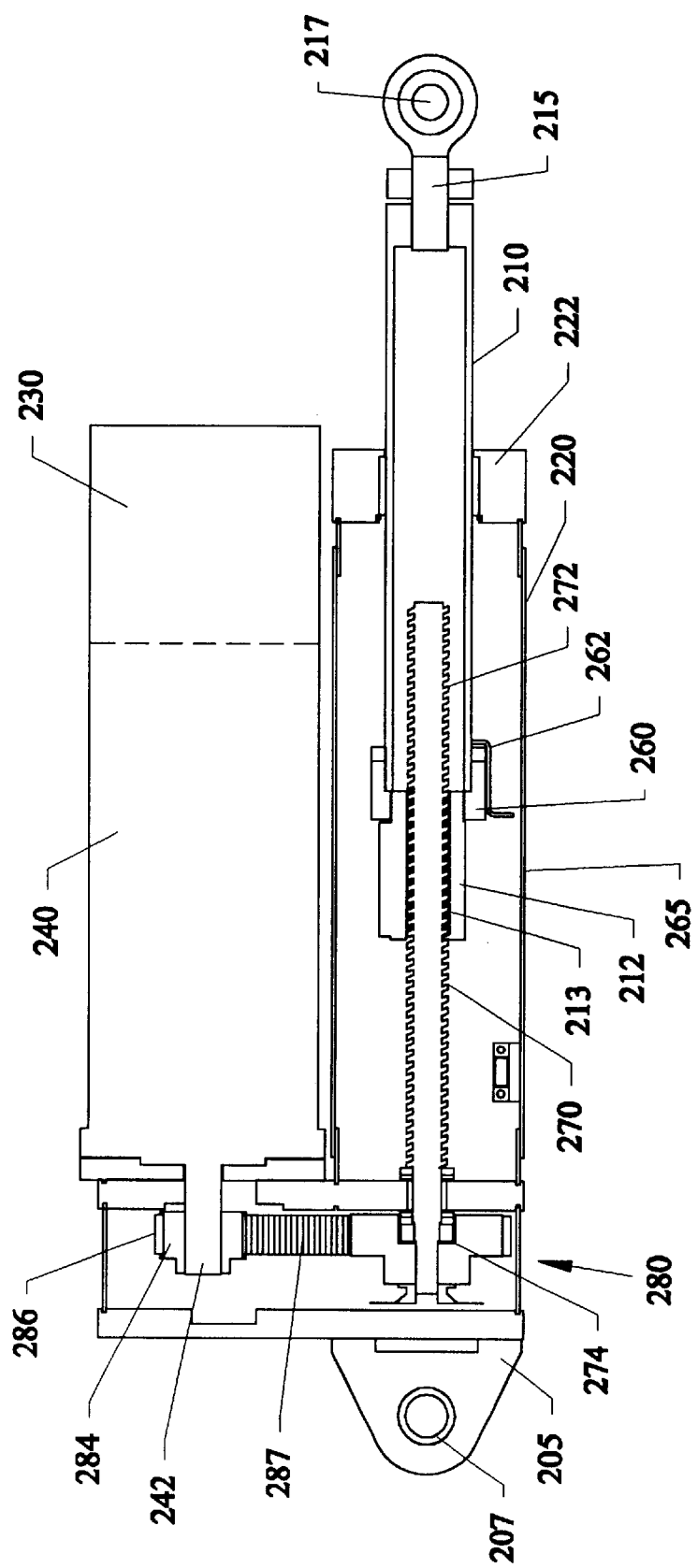
FIG. 5D is a cross-sectional view of the actuator and motor assembly of FIG. 5A along arrow C6, which is also a break-away view of the actuator motor assembly of FIG. 5C.

FIG. 5A is a front view of the actuator 200 of FIG. 4A along arrow C4 with the lead screw and drive gear shroud covers 220 and 226 removed. FIG. 5B is a rear view of the actuator of FIG. 4A along arrow C3 with the lead screw and drive gear shroud covers 220, 226 removed. FIG. 5C is a left view of the actuator 220 of FIG. 5B along arrow C5 with the lead screw and drive gear shroud covers 220, 226 removed. FIG. 5D is a cross-sectional view of the actuator 200 of FIG. 5A along arrow C6, which is also a break-away view of the actuator motor 200 of FIG. SC.

Referring to FIG. 5A–5D, two hollow steel guide rods 252,254 s lave the central lead-screw piston 210, and add strength and stability to its movement. Each of the guide rods 252, 254 can be held in place via a bottom end such as a screw end that attaches to bottom plate 228, the belt-driven gear assembly portion 280, the spacer plate 253 and fixably attached to cap lid 222 where the guide rods are secured in place with rounded half-nuts 221, 223. A lead-screw 270 is attached to a rotatable gear 282 (in the belt-driven gear assembly 280), which is used to convert rotary motion to linear motion via a screw mechanism in the piston shaft. The two steel guide rods and the lead-screw piston 210 are shown to be held within a movable yoke 260 the latter of which is fixably attached to the piston 210 by to move up or down in a stable and precise manner. An optical sensor 265 can be attached inside cover 220 and be used to stop the piston 210 from traveling beyond that point by reading tip 262. A second rotatable gear 284 can be connected to the rotatable drive shaft 242 of the motor 240. About gear 284 is a belt 286 having an interior toothed surface 287 which is also wrapped about gear 282 for which it is used to motivate the base portion 274 of lead-screw 270. The upper threaded portion 272 of the lead screw 270 can screw into the interior threads 213 of piston base 212. Rotating of the lead screw 270 by the motor 240 depends on the joystick/cyclic 300(to be described in detail later) input by a seated player.

Figure 6:
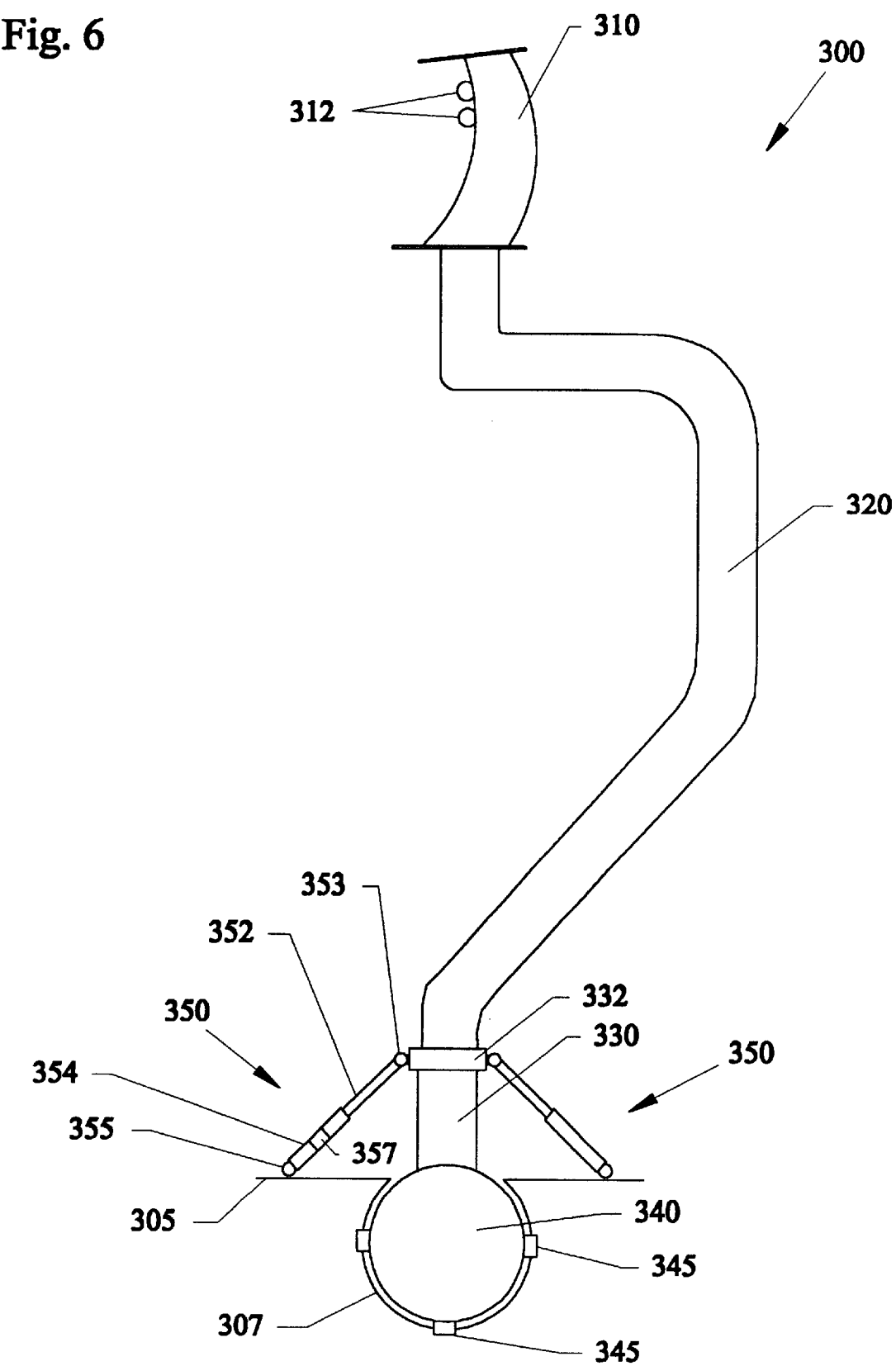
FIG. 6 is an enlarged cross-sectional view of a joystick/cyclic control used in FIGS. 1A–2.

FIG. 6 is an enlarged cross-sectional view of a joystick/cyclic control 300 used in FIGS. 1A, 1B, and 2. Joystick control 300 can include a handle grip end 310 that can include push buttons 312 for allowing weapon fire or other simulation and computer control functions during the simulation game. Joystick 300 can have a curved C-shaped midportion 320 to replicate that of a helicopter control stick and a lower base 330 having a ball end 340 which fits within and is mounted to a mating curved interior surface 307 within floor 305 and can move therein by ball bearings, 345, rollers, and the like. The Base 330 has a slip ring 332 that is connected to floor by four spring loaded piston actuators 350(only two are shown for clarity). Each of the spring loaded actuators 350 can include a base cylinder portion 354 pivotally mounted at end 355 to floor 305, and an inwardly biased piston 352 having an outside end 353 pivotally attached to connector ring 332. Each of the actuators 350 can include potentiometers 357 such as but not limited to 10K potentiometers from Digi-Key Inc. which can be used to sense the position of the joysticks 300 and is used to control the extension and retraction of the pistons 210, 210' in the actuators 200, 200' previously described.

Although the preferred embodiment describes using a joystick to control the actuators for the motion platform, other types of controls can be used such as but not limited to a steering wheel, a rotatable computer mouse pad, and the like. For example, the subject invention can use the steering device and controls shown and described in U.S. Pat. No. 4,478,407 to Manabe which is incorporated by reference. Alternatively, the subject invention can use the joysticks and controls shown and described in U.S. Pat. No. 5,490,784 to Carmein which is also incorporated by reference.

Figure 7B:
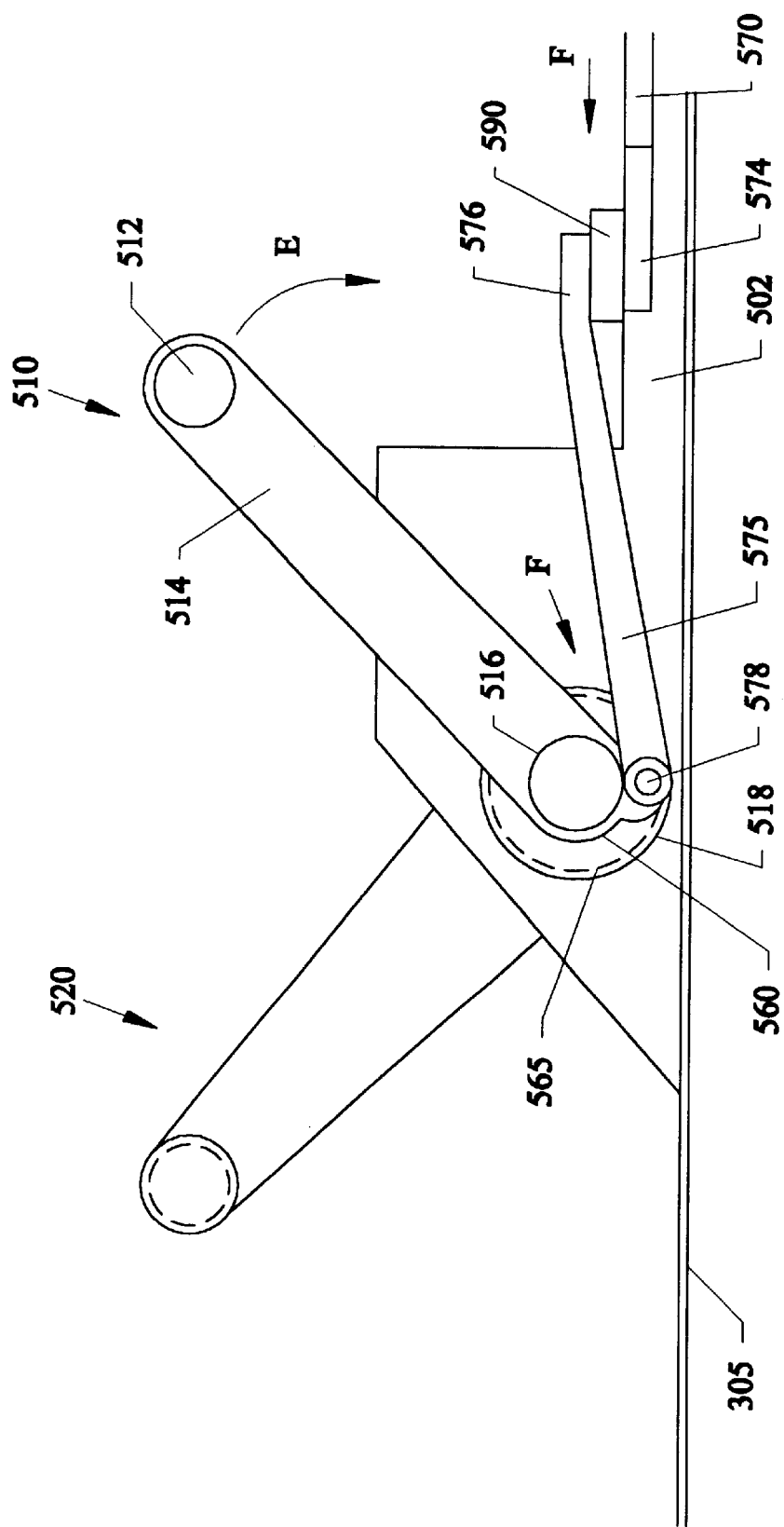
FIG. 7B is an end view of the rudder control pedals of FIG. 7A along arrow D.

FIG. 7A is a top view of the rudder control pedal assembly 500 of FIG. 2. FIG. 7B is an end view of the rudder control pedals 500 of FIG. 7A along arrow D. Referring to FIGS. 7A–7B, assembly 500 includes four pedals 510, 520, 530 and 540, an outer rotatable cylinder 550 and inner rotatable cylinder 560, a first spring loaded piston 570, a second spring loaded piston 580 and pivoting plate connector 590. Note that the first set of a right pedal 510 and a left pedal 520 are positioned in front of seat 70' in FIG. 2, and the second set of a right pedal 530 and a left pedal 540 are positioned in front of seat 70 in FIG. 1. Outer cylinder 550 can rotate relative to inner cylinder 560 by bearings 565. Both outer rotatable cylinder 550 and inner rotatable cylinder 560 can be held in place by floor mount supports 502, 504 and 506. Both the bases of right foot pedal 510 and right foot pedal 530 are fixably secured to inner cylinder 560 by welds, and the like, and in effect having both right foot pedals married to one another. FIG. 7B shows one of these connection points at 516. Each pedal has a foot rest peg portion(only 512 is identified) fixably and perpendicularly attached to a connecting leg 514 which in turn is fixably attached to the cylinder 560. Additionally, both left foot pedals 520 and 540 similarly have their bases fixably adhered by welds and the like to the exterior surfaces of outer cylinder 550, so that both left foot pedals are in effect married to one another. Therefore moving one left foot pedal automatically moves the other left foot pedal, and moving one right foot pedal automatically moves the other right foot pedal.

Referring to FIGS. 7A–7B, a first spring loaded piston 570 has one end 572 pivotally attached to a lower rear wall 307 and another end 574 pivotally attached to one end of a swivel plate 590. On top of the same edge of swivel plate 590 is a pivotal connection to the outer end 576 of arm 575. The other end 578 is pivotally connected to a lower edge 518 of pedal leg 514. Left pedal 520 has similar connections to an arm 520 which is pivotally connected to swivel plate 590, which is pivotally connected to second spring loaded piston 580 which is also pivotally connected to rear wall 307. The middle portion 592 of swivel plate 590 is pivotally connected to an upper edge of floor mount support 502. Thus, pushing and causing right foot pedal 510 to rotate forward in the direction of arrow E simultaneously moves the other right foot pedal 530 and causes arm 575 to move in the direction of arrow F and piston spring 570 to stretch in the direction of arrow F. Simultaneously, with the pushing of right foot pedal 510, swivel plate 590 rotates clockwise about pivot point 592 causing arm 585 to move in the direction of arrow G causing left foot pedal 520 and left foot pedal 540 to also move in the direction of arrow G. Floor mounted potentiometers 505 can be connected to both cylinders 550 and 560 and be used to measure the rotated positions of the cylinders as they are being rotated by the foot pedals, and be connected to the rest of the system components as explained in FIGS. 9–10 in order to rotate the images on the display 20 of FIGS. 1A–2.

Figure 8:
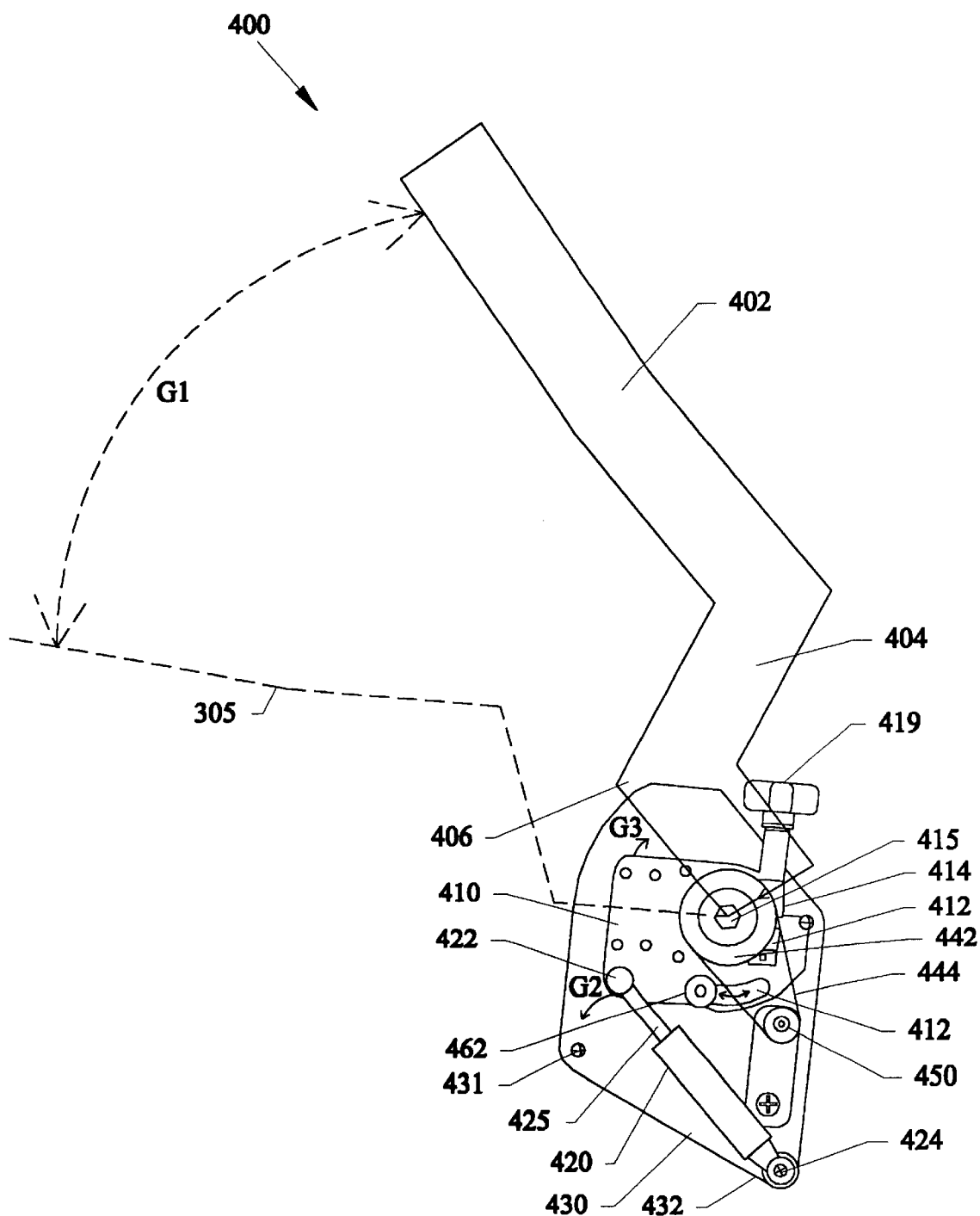
FIG. 8 is a side view of the altitude control lever shown in FIGS. 1A–2.

FIG. 8 is a side view of the altitude control lever 400 shown in FIGS. 1A–2, which can be floor mounted. Lever 400 has an L-shaped arm portion 402, 404 with a lower bent arm 406 which is fixably attached to a plate 410 which both rotate in the direction of arrow G1 about an axle 415 which acts as a pivot point, where axle 415 is connected to non moving support plate 430. Nonmoving support plate 430 is fixably attached within floor 305 by fasteners 431. A spring loaded piston 420 has one end 422 pivotally connected to an edge of rotating plate 410 and a second end 424 connected to a lower portion 432 of a support plate 430. A pulley wheel 442 is rotatably attached to axle 415, and has a belt 444, which also passes about a potentiometer 450(such as a 10K potentiometer from Digi-Key), which measures the position of the lever arm 400. A stop 460 can be attached to the support plate 430, so that an elongated opening 412 in rotating plate 410 allows for the stop 460 to be limited to travelling to selected locations limiting the travel of upper level 402. A player holding arm portion 402 can push the lever downward in the direction of arrow G1 causing plate 410 to rotate about axle 415 in the direction of arrow G2 compressing piston 425 within a spring biased cylinder 420. Pulling lever upward in the opposite direction of arrow G1 causes plate 410 to rotate in the direction of arrow G3 pulling piston 425 from cylinder 420. A rotatable tension knob 419 passes through an upper portion 414 which is separated by a space and into a lower portion 412 of rotating plate 410, where the upper portion 414 is above and the lower portion 412 is under axle 415. Rotating tension knob 419 clockwise tightens about axle 415 increases the difficulty of rotating lever 400. Likewise rotating knob 419 counter-clockwise loosens the tension making lever 400 easier to use. Lever 400 can be used by either player to raise the altitude of an image of the display 20(shown in FIGS. 1A–2).

Figure 9:
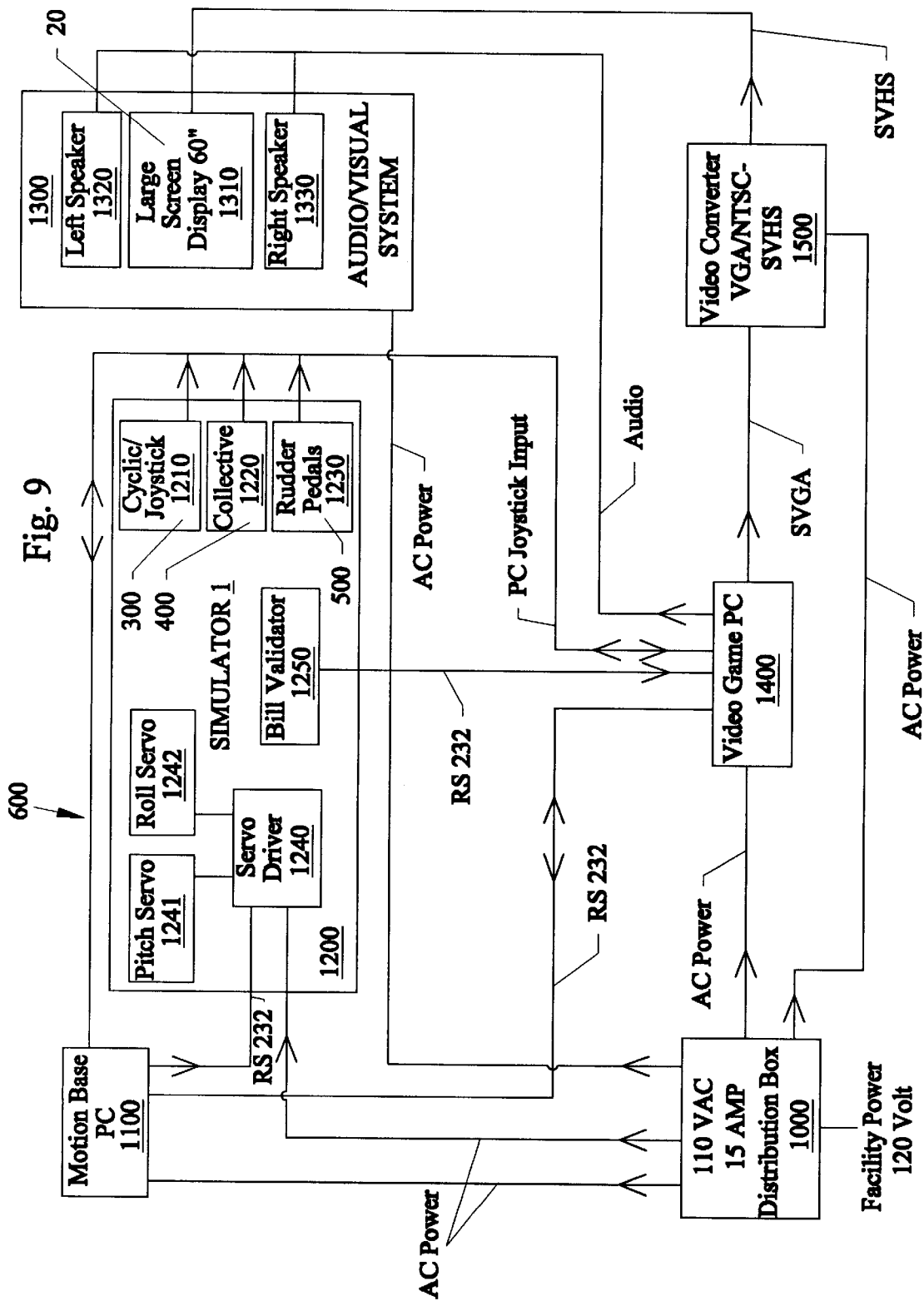
FIG. 9 shows a schematic layout of the components used to control the components of the preceding figures.

FIG. 9 shows a schematic layout 600 of the components used to control the components of the preceding figures in a preferred setup. The system 600 can be connected to a 120 Volt power supply and is powered via the Distribution Box 1000, containing 110 VAC/15 AMP circuitry. That, in turn, provides AC power to the Motion Base PC (computer)1 1100, such as a DELL Pentium m 400MHz, which is connected by an RS232 line to the Simulator components 1200 which include a servo driver 1240 for interfacing with a pitch servo 1241 which control the forward and backward pitch of the simulator platform 110, and roll servo 1242 which controls right roll and left roll of the platform 110. As previously explained the Pitch Servo 1241 and Roll Servo 1242 control motors, such as API Motion 1.5 H.P. Cycletrol® 3278, which controls the actuators 200, 200' shown and described in FIGS. 3A–5D, which move the platform 110 of the system 1.

Referring to FIG. 9, power supply 1000 also supplies power to the Servo Driver 1240, the audio visual system 1300, the Video Game PC(computer) such as a DELL Pentium III 400 MHz, and the video converter VGA/NTSC-SCVHS 1500 such as an Extron Electronics 800 Jr. NTSC Scan Converter.

To start the system 600, a player inserts currency into the bill validator 1250, such as a Mars Electronics' 2600 Bill Acceptor. Once receiving the appropriate amount of currency, bill validator 1250 sends a signal to the Video Game PC 1400, via RS232 cabling, to start the game/system/simulator. The Video Game PC 1400 translates the motion information, and interacts with the OTS game software, such as Hasbro Interactive's Gunship III, and Team Apache by KUJU Entertainment Inc.), sending the video signal via SVGA cabling, through the Video Converter 1500, which converts the SVGA signal to an SVHS signal, to the Large Screen Display 60" 1310(20 FIGS. 1A–2), such as a Mitsubishi V4063 60" Television monitor, and the audio signal directly to the Left Speaker 1320 and Right Speaker 1330, such as NEC GMS20NF Powered Computer Speakers.

The players manipulating the cyclic/joystick 1210(300 FIG. 6) and the collective altitude lever 1220(400 FIG. 8) and the rudder pedals 1230(500 FIGS. 7A–7B) feed signals back and forth to both the video game PC 1400 and the Motion Base PC 1100. The Motion Base PC (1100) also interacts with the servo driver 1240 to provide control of the pitch servo 1241 and roll servo 1242 that controls the actuators 200, 200' shown and described in FIGS. 3A–5D

Figure 10A:
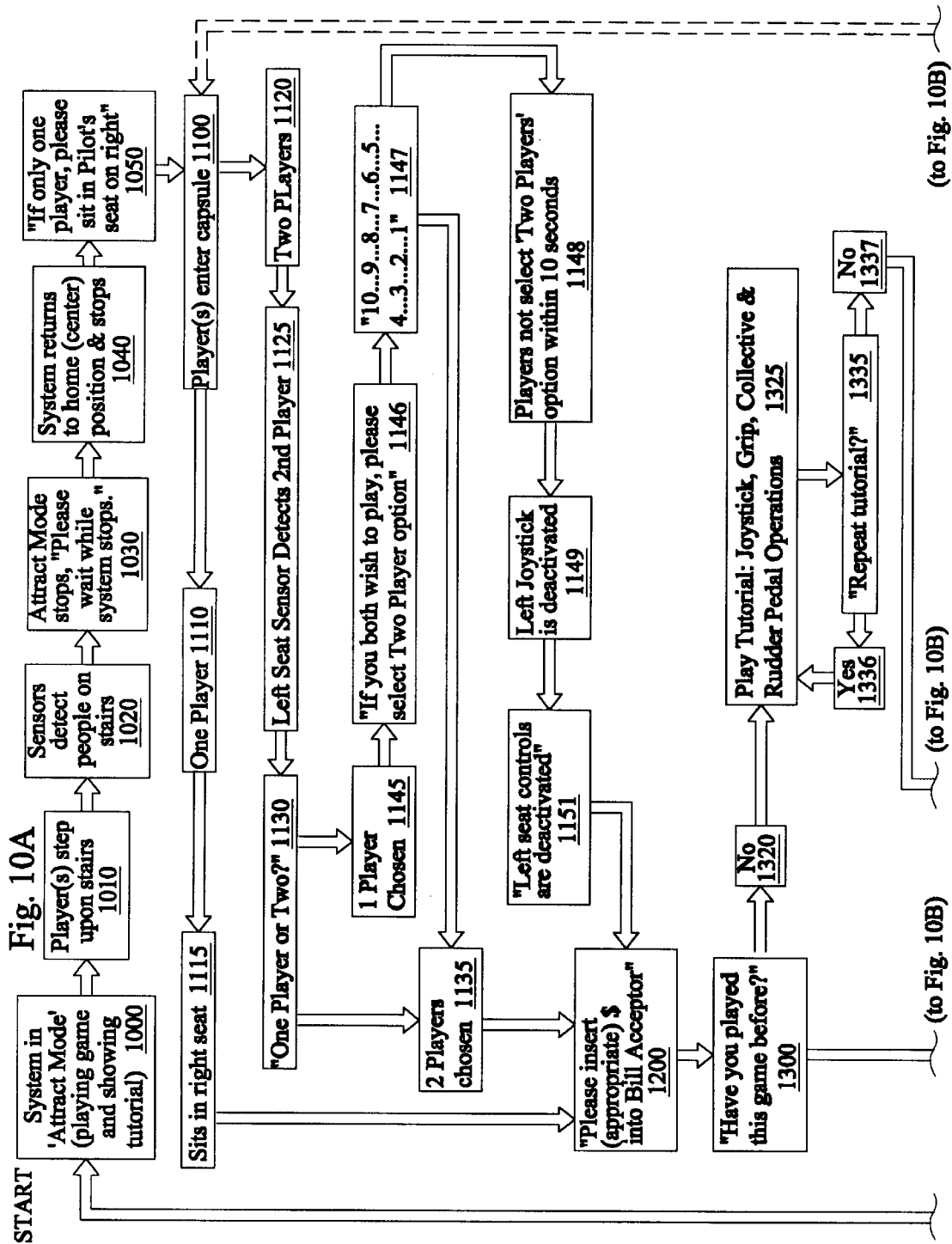

FIGS. 10A and 10B is a flow chart of the steps of a preferred program that can be used to run a simulation game for the invention. In the first step 1000 the system 600(FIG. 9) is in 'Attract Mode' (demonstrating the game on display 20(FIGS. 1A–2), showing a tutorial. Step 1010 (FIG .2) occurs if someone steps onto the stairs which, to enter the game. In step 1020(FIG. 2), pressure sensors in the stairs detect their presence, and in step 1030 the Attract Mode on the display 20 stops, while "Please wait while system stops" is displayed on the screen, and in step 1040 the system allows Player(s) to enter. In step 1050 a message "If only one player, please sit in Pilot's seat on right" is displayed on the screen 22(FIGS. 1A–2). In step 1100 one player or two players enter the capsule(10 FIGS. 1A–1B). Step 1110 occurs if only one player and in step 1115 He/she will sit in the right seat. Step 1120 occurs if two players sit down. In step 1125 a pressure sensor in the left seat will detect the second player. In step 1130 question, "One Player or two?" (is displayed on the screen). Step 1135 occurs If '2 Players' is chosen (using either joystick/trigger), then in step 1200 player(s) instructed to "Please insert X$ into Bill Acceptor" will be displayed on the screen. In step 1145 if '1 Player' is chosen, then in step 1146 the system 600 will suggest that, "If you both wish to play, please select Two Player option" (displayed on the screen). In step 1147 the system will then count down (onscreen) from ten seconds, to allow time for the Players to choose '1 Player' or '2 Players' . In step 1135 If ' 2 Players' is chosen (using either joystick/trigger), then step 1200 instruction "Please insert X$ into Bill Acceptor" will be displayed on the screen. Step 1148 occurs if Players not select '2 Players' option within seconds and in step 1149 the Left joystick is deactivated, and in 1151 "Left seat controls are deactivated" is displayed on the screen. In step 1200 "Please insert X$ into Bill Acceptor" will be displayed on the screen. In step 1300 Once the appropriate amount of currency/credit has been deposited into the bill validator, the system 600 will ask (onscreen) "Have you played this game before?" System goes to step 1310 if the Player(s) answer 'Yes', then in step 1400 the Player(s) will be asked to choose the level of difficulty of play ("Choose Difficulty" will show onscreen). Step 1320 occurs if the Player(s) answer 'No', then step 1325 occurs where the system will play the 30-second Tutorial, showing how to operate the Joystick, Grip, Collective lever & Rudder Pedals 1335. In case the Player(s) didn' t quite understand it the first time, the system will ask (onscreen) "Repeat tutorial?" In step 1336 if the Player(s) answer 'Yes', then step 1325 the system will replay the 30-second Tutorial. In step 1335 "Repeat tutorial?" will be asked onscreen again, then step 1337 occurs if the Player(s) answer 'No', followed by step 1400 where the Player(s) will be asked to choose the level of difficulty of play. Step 1410 occurs if the Player(s) answer 'Yes', then in step 1415 the Player(s) will use the joystick/trigger to choose either: LI "Lieutenant"—the Player(s) operate only the Joystick, and this choice instructs the system to automatically adjust altitude in the game- For level L2 "Captain" the Player(s) operate both the Joystick & Collective lever. And for level L3 "Major", the Player(s) operate the Joystick, Collective lever & Rudder Pedals. In step 1500, the Player (s) will be asked to choose the mission they wish to play ("Choose Mission" will be displayed onscreen). Step 1420 occurs if the Player(s) answer 'No', then step 1425 where the game automatically defaults to "Lieutenant" (LI). If in step 1510 the Player(s) answer 'Yes', then step 1515 the Player(s) will use the joystick/trigger to choose either: FF "Free Flight" the Player(s) familiarize themselves with the system & game by flying around the terrain without any particular mission (or enemies) MI "Mission 1"—one game scenario, M2 "Mission 2" —another game scenario, M3 "Mission 3" —yet another game scenario. In step 1600 then the game will begin. Step 1520 occurs if the Player(s) answer 'No', then step 1525 The Game defaults to "Free Flight", then step 1600 the game will begin. Step 1610 occurs once the Player(s) use up 4 'lives' followed by step 1620 the Game stops, and in step 1630 the system asks (onscreen), "Please insert X$ to continue". In step 1640, the system will then count down (onscreen) from ten seconds, to allow time for the Players to insert the required money/card. Step 1645 occurs if Players insert the required money/card within 10 seconds. In step 1646 the game continues by providing the Player(s) another 4 'lives', and continuing where they left off. Step 1655 occurs if Players fail to insert the required money/card within 10 seconds, and in step 1700 the game ends. In step 1710 the message "Please wait while system stops." will display onscreen, while in step 1720 the system returns to home (center) position and allows Player (s) to step 1730 disembark. Step 1740 occurs if there's no activity during the next 10 seconds, then step 1000 the system returns to 'Attract Mode'. Step 1750 occurs if the next player(s) in the queue step onto the stairs, then the system 600 returns to step 1100 where Player(s) enter the capsule 10(FIGS. 1A–1B). The player can depress the 312 buttons on the joystick 300 to answer the questions posed above.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A two person interactive full motion simulator, comprising in combination:

a vehicle;

a platform for supporting the vehicle over a base;

first actuator means for controlling pitch of the platform for causing the platform to tilt forward and to tilt backward, the first actuator means consisting solely of one extendible piston assembly having one upper end and one lower end, the one upper end being pivotally attached to a first undersurface portion of the platform and the one lower end being pivotally attached to the base, the one extendible piston assembly of the first actuator consisting solely of a single piston that is extendible from the one extendible piston assembly;

second actuator means for controlling roll of the platform for causing the platform to roll left and roll right, the second actuator means consisting solely of one extendible piston assembly having one upper end and one lower end, the one upper end being pivotally attached to a second undersurface portion of the platform different from the first undersurface portion, and the one lower end being pivotally attached to the base, the one extendible assembly of the second actuator means consisting solely of a single piston that is extendible from the assembly, the first actuator means and the second actuator means being adjacent to one another substantially underneath a middle portion of the platform, and oriented substantially perpendicular to one another;

a first player control means that can be used by a first player for controlling the first actuator means and the second actuator means; and a second player control means that can be used by a second player for controlling the first actuator means and the second actuator means.

2. The two person interactive full motion simulator of claim 1, further comprising:

means for displaying yaw images of the vehicle to the first player and the second player;

a first foot pedal means on the vehicle that can be used by the first player for controlling the yaw images on the display means; and a second foot pedal means on the vehicle for the second player for controlling the yaw images on the display means, wherein the first player and the second player can alternate in actively controlling the yaw images on the display means.

3. The two person interactive full motion simulator of claim 1, further comprising:

means for displaying an image to the first player and the second player; and an altitude control means on the vehicle that can be used by at least one of the first player and the second player for controlling altitude on the display images.

4. The two person interactive full motion simulator claim 3, wherein the first joystick and the second joystick each include:

means for operating at least one of: a weapon, the display image, and a question answer.

5. The two person interactive fill motion simulator of claim 4, wherein the first player control means and the second player control means each include:

means for operating at least one of a weapon, the display image, and a question answer.

6. The two person interactive full motion simulator of claim 5, wherein the first joystick can simultaneously control thef actuator means, the second actuator means and the operating means.

7. The two person interactive full motion simulator of claim 5, wherein the first joystick can control the first actuator means and the second actuator means and the second joystick can control the operating means.

8. The two person interactive fill motion simulator of claim 1, wherein each of the first actuator means and the second actuator means include:

the piston connected to a yoke that moves up and down about dual guide rods.

9. The full motion interactive simulator of claim 8, wherein the first control means and the second control means each include:

means for operating at least one of a weapon, a display image on a display means, and a question answer.

10. A full motion interactive simulator for at least one player, comprising in combination:

a vehicle;

a platform for supporting the vehicle over a base;

first actuator means for controlling pitch of the platform for causing the platform to tilt forward and tilt backward, the first actuator means consisting solely of one extendible piston assembly having one upper end and one lower end, the one upper end being pivotally attached to a first undersurface portion of the platform and the one lower end being pivotally attached to the base, the one extendible piston assembly of the first actuator consisting solely of a single piston that is extendible from the one extendible piston assembly;

second actuator means for controlling roll of the platform for causing the platform to roll left and roll right, the second actuator means consisting solely of one extendible piston assembly having one upper end and one lower end, the one upper end being pivotally attached to a second undersurface portion of the platform different from the first undersurface portion, and the one lower end being pivotally attached to the base, the one extendible assembly of the second actuator means consisting solely of a single piston that is extendible from the assembly, the first actuator means and the second actuator means a being adjacent to one another substantially underneath a middle portion of the platform, and oriented substantially perpendicular to one another;

a first player control means that can be used by a first player for controlling the first actuator means and the second actuator means at one time; and a second player control means that can be used by a second player for controlling the first actuator means and the second actuator means at a different time than the first player control means.

11. The full motion interactive simulator of claim 8, wherein the extendable piston assembly includes:

the piston connected to a yoke that moves up and down about guide rods.

12. An interactive full motion simulator, comprising in combination:

a vehicle;

a platform for supporting the vehicle over a base;

first actuator means for controlling pitch of the platform for causing the platform to tilt forward and tilt backward, the first actuator means consisting solely of one extendible piston assembly having one upper end and one lower end, the one upper end being pivotally attached to a first undersurface portion of the platform and the one lower end being pivotally attached to the base, the one extendible piston assembly of the first actuator consisting solely of a single piston that is extendible from the one extendible piston assembly;

second actuator means for controlling roll of the platform for causing the platform to roll left and roll right, the second actuator means consisting solely of one extendible piston assembly having one upper end and one lower end, the one upper end being pivotally attached to a second undersurface portion of the platform different from the first undersurface portion, and the one lower end being pivotally attached to the base, the one extendible assembly of the second actuator means consisting solely of a single piston that is extendible from the assembly, the first actuator means and the second actuator means being adjacent to one another substantially underneath a middle portion of the platform, and oriented substantially perpendicular to one another;

player control means for controlling the first actuator means and the second actuator means.

13. The interactive full motion simulator of claim 12, wherein each of the piston assemblies of the first actuator means and the second actuator means includes:

the piston connected to a yoke that moves up and down about dual guide rods.

14. The full motion interactive simulator of claim 10, wherein each of the first actuator means and the second actuator means include:

the piston connected to a yoke that moves up and down about guide rods.

15. An interactive full motion simulator, comprising in combination:

a vehicle;

a platform for supporting the vehicle over a base;

first actuator means for controlling pitch of the platform for causing the platform to tilt forward and tilt backward, the first actuator means consisting solely of one extendible piston assembly having one upper end and one lower end, the one upper end being pivotally attached to a first undersurface portion of the platform and the one lower end being pivotally attached to the base, the one extendible piston assembly of the first actuator consisting solely of a single piston that is extendible from the one extendible piston assembly;

second actuator means for controlling roll of the platform for causing the platform to roll left and roll right, the second actuator means consisting solely of one extendible piston assembly having one upper end and one lower end, the one upper end being pivotally attached to a second undersurface portion of the platform different from the first undersurface portion, and the one lower end being pivotally attached to the base, the one extendible assembly of the second actuator means consisting solely of a single piston that is extendible from the assembly, the first actuator means and the second actuator means being adjacent to one another substantially underneath a middle portion of the platform, and oriented substantially perpendicular to one another;

player control means for controlling the first actuator means and the second actuator means.

16. The interactive full motion simulator of claim 15, wherein each of the piston assemblies of the first actuator means and the second actuator means includes:

the piston connected to a yoke that moves up and down about dual guide rods.

* * * * *